United States Patent [19]
Rupp et al.

[11] Patent Number: 5,768,162
[45] Date of Patent: Jun. 16, 1998

[54] DATA BUS RECORDER

[75] Inventors: Michael E. Rupp, Amherst; Adam V. Magoss, Snyder; Ronald G. Putzbach, Amherst, all of N.Y.; Michael P. Morford; Gregory H. Kramer, both of Camarillo, Calif.; Larry D. Fitzgerald, Oxnard, Calif.

[73] Assignee: Comptek Federal Systems, Inc., Buffalo, N.Y.

[21] Appl. No.: 506,928

[22] Filed: Jul. 26, 1995

[51] Int. Cl.$^6$ .................................................. G06F 3/00
[52] U.S. Cl. .................... 364/579; 364/240.8; 364/244.8; 395/200.3; 395/200.83
[58] Field of Search ...................... 364/579, 240, 364/260, DIG. 1, 238.3, 228–229, 239, 284, 244.8; 395/200.01, 425, 280, 285, 309, 200.3, 439, 200.83, 800.37, 858; 370/402

[56] References Cited

U.S. PATENT DOCUMENTS

| | | | |
|---|---|---|---|
| 5,001,704 | 3/1991 | Narup et al. | 370/402 |
| 5,349,685 | 9/1994 | Houlberg | 364/240.8 |
| 5,388,243 | 2/1995 | Glider et al. | 395/858 |
| 5,430,849 | 7/1995 | Banks | 364/DIG. 1 |
| 5,454,085 | 9/1995 | Gajjar et al. | 395/285 |
| 5,471,632 | 11/1995 | Gavin et al. | 395/284 |
| 5,530,845 | 6/1996 | Hiatt et al. | 395/500 |
| 5,550,991 | 8/1996 | Keener et al. | 395/309 |

Primary Examiner—James P. Trammell
Assistant Examiner—Bryan Bui
Attorney, Agent, or Firm—Hodgson, Russ, Andrews, Woods & Goodyear LLP

[57] ABSTRACT

A method and apparatus for monitoring a data bus which transfers digital information and commands between components of a system wherein the bus operates according to a designated protocol and is of the serial, asynchronous type employing Manchester encoding. A bus interface provides communication with the bus for receiving and processing message data from the bus, and a storage interface provides communication with an external mass storage device such as a hard disk and also stores an operational program for the data bus recorder. A processor connected to both interfaces receives information from the storage interface which defines message collection via a configuration file, utilizes the operational program from the storage interface, controls operation of the bus interface including initialization and filtering of the bus message traffic in accordance with the configuration file, and controls transfer of recorded bus message data to the external mass storage device via the storage interface. A user operated control unit selectively connected to the processor commands the starting and stopping of bus reading and also provides visible status indications. A personal computer is utilized to specify the configuration file on the mass storage device, i.e. disk, which defines the messages to collect from the bus, and it is utilized to analyze the data recorded from the bus on the disk. The data bus recorder is particularly advantageous for use with one or more MIL-STD-1553 buses.

17 Claims, 25 Drawing Sheets

File Format

| Flag Word Definition | Bit Number | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| | Message Time / Control Flag | | | | | | | | s | Bu | Word Count | | | | | |
| Message | Time Rollover, LSB = 8µs * 2^16 | | | | | | | | 1 | Bus | Word Count | | | | | |
| Time Rollover | 0x00 | | | | | | | | 0 | Bus | 1 | | | | | |
| Loss of Data | 0x01 | | | | | | | | 0 | X | 0 | | | | | |
| File Version | 0x02 | | | | | | | | 0 | X | 1 | | | | | |
| Reserved | ( All other values) | | | | | | | | 0 | X | Word Count | | | | | |
| Ignore Data | 0xFE | | | | | | | | 0 | X | Word Count | | | | | |
| End of File | 0xFF | | | | | | | | 0 | X | 0 | | | | | |

| Message Data Packet Format | Bit Number | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Word 0 (Flag Word) | Time Rollover, LSB = 8µs * 2^16 | | | | | | | | 1 | Bus | Word Count | | | | | |
| Word 1 | Time Tag from command stack, LSB = 8µs | | | | | | | | | | | | | | | |
| Word 2 | Block Status Word from Command Stack | | | | | | | | | | | | | | | |
| Word 3 | Command Word from command stack | | | | | | | | | | | | | | | |
| Word 4 - (Word Count) | (Word Count) - 3 Data Words from data stack | | | | | | | | | | | | | | | |

| Time Rollover Packet Format | Bit Number | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Word 0 (Flag Word) | 0x00 | | | | | | | | 0 | Bus | 1 | | | | | |
| Word 1 | Time Rollover, LSB = 8µs * 2^24 | | | | | | | | | | | | | | | |

| Block Status Word Bit Field Definitions | Bit Number | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Field Description | End of Message | Start of Message | Channel B/A* | Error Flag | RT-to-RT Transfer | Format Error | No Response Timeout | Good Data Block Xfer | Data Stack Rollover | Reserved | Word Count Error | Incorrect Sync | Invalid Word | RT-RT Gap/Sync/Adr Error | RT-RT 2nd Command Error | Command Word Contents Error |

| Command Word Field Definitions | Bit Number | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Field Description | RT Address | | | | | T/R | Subaddress / Mode | | | | | Data Word Count / Mode Code | | | | |

| File Version Packet Format | Bit Number | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Word 0 (Flag Word) | 0x02 | | | | | | | | 0 | X | 1 | | | | | |
| Word 1 | File Format Version Number | | | | | | | | | | | | | | | |

FIGURE 23

| | BC to RT Transfer (Receive) | RT to BC Transfer (Transmit) | RT to RT Transfer | Mode Code Without Data | Mode Code With Data (Transmit) | Mode Code With Data (Receive) |
|---|---|---|---|---|---|---|
| Bus Data | Receive Command | Transmit Command | Transmit Command Receive Command | Mode Command | Mode Command | Mode Command |
| | Data Word #1 | ** | ** | ** | ** | Data Word |
| | Data Word #2 | Status Word | Status Word | Status Word | Status Word | ** |
| | ... | Data Word #1 | Data Word #1 | # | Data Word | Status Word |
| | Last Data Word | Data Word #2 | Data Word #2 | Next Command... | # | # |
| | ** | ... | ... | | | Next Command... |
| | Status Word | Last Data Word | Last Data Word | | | |
| | # | # | ** | | | |
| | Next Command... | Next Command... | Status Word | | | |
| | | | # | | | |
| | | | Next Command... | | | |
| Command Stack | Block Status Word | Block Status Word | Block Status Word | Block Status Word | Block Status Word | Block Status Word |
| | Time Tag | Time Tag | Time Tag | Time Tag | Time Tag | Time Tag |
| | Data Pointer | Data Pointer | Data Pointer | Data Pointer | Data Pointer | Data Pointer |
| | Receive Command | Transmit Command | Receive Command | Mode Command | Mode Command | Mode Command |
| Data Stack | Data Word #1 | Status Word | Transmit Command | Status Word | Status Word | Data Word |
| | Data Word #2 | Data Word #1 | Status Word | Data Word | Data Word | Status Word |
| | ... | Data Word #2 | Data Word #1 | | | |
| | Last Data Word | ... | Data Word #2 | | | |
| | Status Word | Last Data Word | ... | | | |
| | | | Last Data Word | | | |
| | | | Status Word | | | |

| Command Stack Data Values | RT to RT | 0 | 0 | 1 | 0 | 0 | 0 |
|---|---|---|---|---|---|---|---|
| | Address | 00000 to 11110 | 00000 to 11110 | 00000 to 11110 | 00000 to 11110 | 00000 to 11110 | 00000 to 11110 |
| | T/R | 0 | 1 | 0 | X | 1 | 0 |
| | Subaddress | 00001 to 11110 | 00001 to 11110 | 00001 to 11110 | 00000 or 11111 | 00000 or 11111 | 00000 or 11111 |
| | Word Count | nnnnn | nnnnn | nnnnn | 0XXXX | 1XXXX | 1XXXX |
| # Data Words | | nnnnn + 1 | nnnnn + 1 | nnnnn + 3 | 0 | 2 | 2 |
| Message Format | | 9 | 6 | 15 | 48 | 112 | 208 |
| Format Code | | BC2RTTransfer | RT2BCTransfer | RT2RTTransfer | ModeCode-NoData | ModeCode-DataTransmit | ModeCode-DataReceive |

Legend: ... = Additional Data Words  ** = Response Time  # = Intermessage Gap

1553 Bus Message Format

FIGURE 24

1553 Bus Message Format

| | BC to RT Broadcast | RT to RT Broadcast | Mode Code Without Data (Broadcast) | Mode Code With Data (Broadcast) |
|---|---|---|---|---|
| Bus Data | Receive Command | Receive Command | Mode Command | Mode Command |
| | Data Word #1 | Transmit Command | # | Data Word |
| | Data Word #2 | ** | Next Command... | # |
| | ... | Status Word | | Next Command... |
| | Last Data Word | Data Word #1 | | |
| | # | Data Word #2 | | |
| | Next Command... | ... | | |
| | | Last Data Word | | |
| | | # | | |
| | | Next Command... | | |
| Command Stack | Block Status Word | Block Status Word | Block Status Word | Block Status Word |
| | Time Tag | Time Tag | Time Tag | Time Tag |
| | Data Pointer | Data Pointer | Data Pointer | Data Pointer |
| | Receive Command | Receive Command | Mode Command | Mode Command |
| Data Stack | Data Word #1 | Transmit Command | | Data Word |
| | Data Word #2 | Status Word | | |
| | ... | Data Word #1 | | |
| | Last Data Word | Data Word #2 | | |
| | | ... | | |
| | | Last Data Word | | |
| Command Stack Data Values — RT to RT | 0 | 1 | 0 | 0 |
| Address | 11111 | 11111 | 11111 | 11111 |
| T/R | 0 | 0 | X | X |
| Subaddress | 00001 to 11110 | 00001 to 11110 | 00000 or 11111 | 00000 or 11111 |
| Word Count | nnnnn | nnnnn | 0XXXX | 1XXXX |
| # Data Words | nnnnn | nnnn + 2 | 0 | 1 |
| Message Format | 1 | 7 | 16 | 80 |
| Format Code | BC2RTBroadcast | RT2RTBroadcast | ModeCodeNo-DataBroadcast | ModeCode-DataBroadcast |

Legend:   ... = Additional Data Words     ** = Response Time     # = Intermessage Gap

FIGURE 25

DATA BUS RECORDER

BACKGROUND OF THE INVENTION

This invention relates to the art of digital data communications, and more particularly to a new and improved apparatus and method for monitoring buses which transmit digital information.

As a result of the expanding use of computers in military and commercial avionic applications, there is a continuing need for electronic equipment capable of monitoring the data buses which provide for the transfer of information and commands between the various electronic equipment which function as part of larger systems. Such monitoring devices allow bus traffic to be passively observed and recorded for analysis either in real time or at some future time (off-line). The purpose and nature of such analysis may be widely varied and may include such functions as status monitoring to ensure correct operation of a system, off-line analysis to determine what events led up to an event of interest (such as a system failure), and so forth.

The specific types of data buses which are utilized in processor based electronic systems also vary greatly. They include any common or standard bus interfaces and protocols such as RS-232, RS-422, IEEE488, Ethernet, and others, as well as proprietary bus protocols. One common bus standard which is established in United States military avionics applications is the MIL-STD-1553 bus. This bus is of the serial, asynchronous type employing Manchester encoding.

Due to widespread use of the MIL-STD-1553 bus for military purposes, a number of bus recorder devices have been developed and are available for use in recording 1553 bus data traffic. The devices typically use a magnetic tape media for recording (usually VHS format) and are relatively large in size making them impractical for use in compact fighter aircraft without significant retrofit. Such recorders also collect data as a continuous stream, as opposed to a database, and therefore must "replay" the recorded data to observe and analyze the events that took place on the bus. Manipulation of collected data as a database for various analyses requires an intermediate step of converting the collected data through some mechanism into its component messages and data.

It would, therefore, be highly desirable to provide a system and method for monitoring a data bus of the serial, asynchronous type employing Manchester encoding in which the system is small in size and light in weight so as to fit in compact installations, in which the system and method are able to record to industry standard mass media storage devices, and in which the system and method record bus coverage traffic selectively as determined by the use and which saves data in a file format compatible with standard personal computers.

SUMMARY OF THE INVENTION

The present invention provides a method and apparatus for monitoring a data bus which transfers digital information and commands between components of a system wherein the bus operates according to a designated protocol and is of the serial, asynchronous type employing Manchester encoding. A bus interface means provides communication with the bus for receiving and processing message data from the bus, and a storage interface means provides communication with an external mass storage device such as a hard disk and also stores an operational program for the data bus recorder. A processor connected to both interfaces receives information from the storage interface which defines message collection via a configuration file, utilizes the operational program from the storage interface, controls operation of the bus interface including initialization and filtering of the bus message traffic in accordance with the configuration file, and controls transfer of recorded bus message data to the external mass storage device via the storage interface. A user operated control unit connected in controlling relation to the processor commands the starting and stopping of bus reading and also provides visible status indications. A personal computer is utilized to specify the configuration file on the mass storage device, i.e. disk, which defines the messages to collect from the bus, and it is utilized to analyze the data recorded from the bus on the disk. The data bus recorder of the present invention is particularly advantageous for use with one or more MIL-STD-1553 buses.

Thus, the present invention provides a small, lightweight, rugged data bus recorder capable of recording the component bus traffic of one or more MIL-STD-1553 buses in the form of binary data words reflecting the command/response messages specific to the 1553A/B protocol. The data bus recorder of the present invention is unique in that it utilizes advanced commercially available technologies packaged in such a manner as to provide a small, lightweight system for the intended application, such as in compact fighter aircraft. Whereas prior art 1553 data bus recorders are comparatively large in size and weight, the data bus recorder of the present invention is designed to be small and lightweight, i.e. approximately 10 lbs. Moreover, data storage can be accomplished using a variety of industry standard mass storage media which are PCMCIA compatible. This allows the user to select a storage media appropriate to the application and allows for easy upgrade of the recorder as PCMCIA compatible technologies advance.

Another unique aspect of the data bus recorder of the present invention is that unlike other 1553 bus recorders, which are designed for recording and replaying bus activity much like a VCR replays recorded video, the data bus recorder of this invention captures bus traffic in a common computer format so as to allow easy manipulation of the data for analysis. As a result, the collected data is already in a format which can easily be manipulated as a database for analytical purposes. Moreover, this database is in an MS-DOS compatible format so that it can be transferred to any commercial personal computer for postprocessing and analysis. Prior art data bus recorders save data in proprietary formats.

As a result of the foregoing distinctions, numerous unique advantages and capabilities arise for the user of the data bus recorder of the present invention. Foremost among these is allowing a user to predefine data filters which qualify message traffic and record only messages of interest, such as those messages specific to a particular 1553 bus remote terminal address. This unique capability results from the fact that the data bus recorder of the present invention interprets the message traffic on the bus and makes decisions as to its content prior to recording it. Prior art data bus recorders simply view data bus traffic as a continuous stream of electronic pulses that are recorded with no interpretation of their content. This is analogous to recording audio messages on a tape recorder. Although the sound can be replayed with great accuracy the content of the message itself cannot be interpreted and analyzed by a computer in its recorded form. The user could not, for example, have a computer search through the data on the tape for all of the messages from a particular person on a given day without first converting the audio data into a form which the computer could interpret.

Thus, the combination of embedded intelligence within the unit and its compressed package size for this class of equipment make the data bus recorder of the present invention unique in the following ways. Its size and weight make it distinctly more compact than other prior art recorders. Its design allows it to record to numerous types of industry standard PCMCIA type mass storage media, such as hard disk or Flash disk (non-volatile). Rather than blindly recording all electronic activity on the target bus in a video format for replay at a later time, the data bus recorder of the present invention records message traffic selectively, based on filters which can be set by the user. In essence it interprets the message traffic in real time to determine if the messages meet the filter criteria and then records only those messages of interest. This selective recording provides a unique advantage for applications concerned with analysis of specific events occurring on the bus. Data collected from the bus is saved in an MS-DOS compatible file format so that the storage media, i.e. hard disk or Flash memory card, can be easily transferred to any standard personal computer for data recovery and analysis.

The foregoing and additional advantages and characterizing feature of the present invention will become clearly apparent upon a reading of the ensuing detailed description together with the included drawing wherein:

BRIEF DESCRIPTION OF THE DRAWING FIGURES

FIG. 23 illustrates the format for recorded 1553 bus data; and

FIGS. 24 and 25 illustrate 1553 bus message formats.

DETAILED DESCRIPTION OF THE ILLUSTRATED EMBODIMENT

Figure 1:
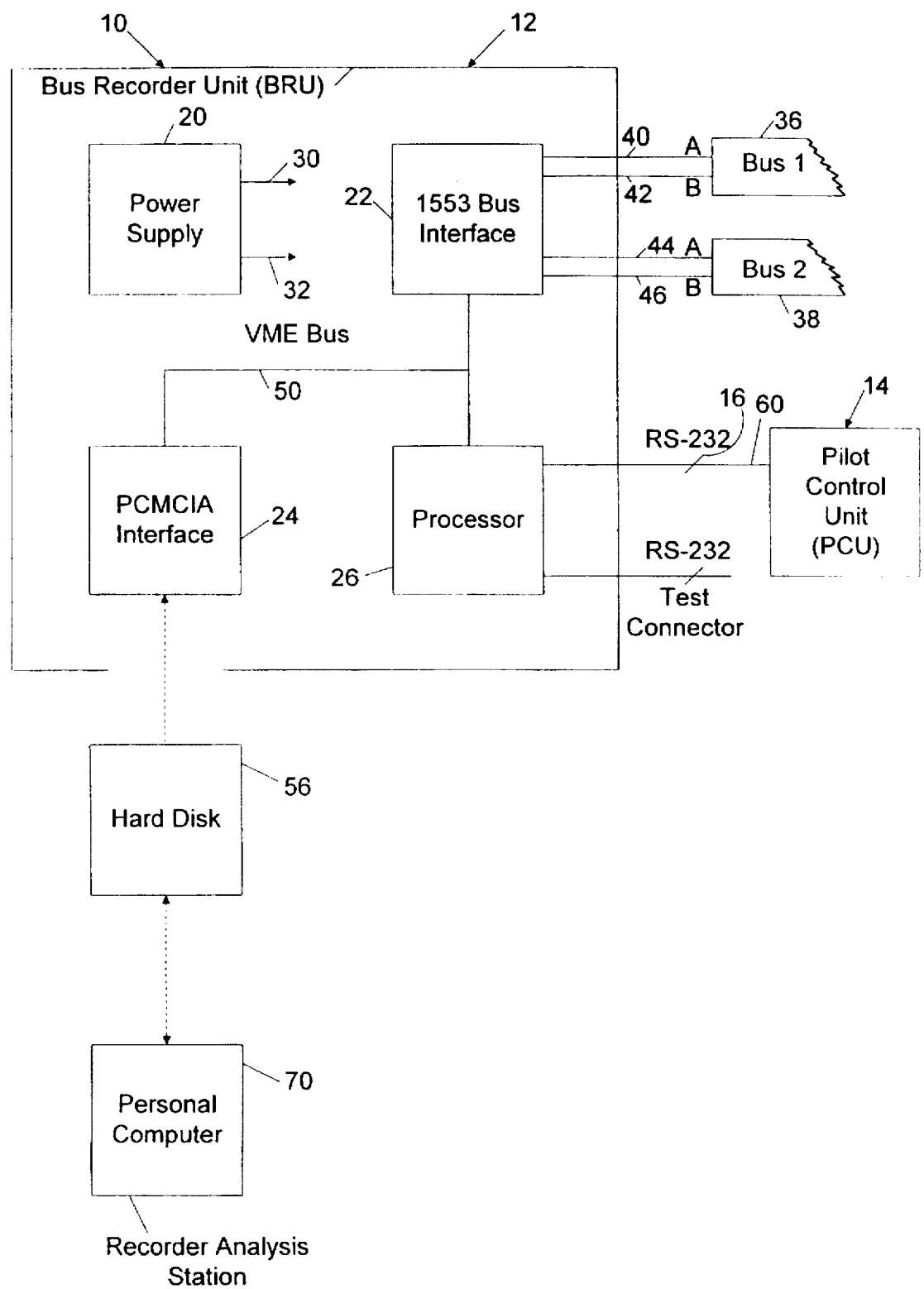
FIG. 1 is a system block diagram of the data bus recorder of the present invention.

The data bus recorder 10 of the present invention is shown in FIG. 1 and includes a bus recorder unit 12 and a pilot control unit 14. The bus recorder unit 12 performs all bus monitoring, processing and data storage functions. The pilot control unit 14 allows the operator to start and stop recording of bus message traffic and provides selected status information. As shown in FIG. 1, pilot control unit 14 is connected to bus recorder unit 12 via an RS-232 connector 16. If pilot control unit 14 is disconnected, the bus recorder unit 12 then operates by starting recording automatically after power up initialization is complete.

The data bus recorder 10 of the present invention finds advantageous use in compact fighter aircraft wherein data buses transmit avionics information such as speed, altitude, position and other navigational information, maintenance information such as pressure and temperature readings on the various equipment, and electronic warfare information relating to radar and countermeasures. As will be described in further detail presently, the extremely compact size of the data bus recorder 10 of the present invention makes it readily and easily accommodated in the cockpit or equipment bays of such an aircraft wherein available space is at an extremely high premium.

The bus recorder unit, in turn, includes a power supply 20, a bus interface 22, a storage interface 24 and a processor 26. Power supply 20, which will be described in further detail presently, accepts 115/230 volt AC power at 50, 60 or 400 Hertz from an external source and generates required DC power at +5, +12 and −12 volts which is sent to components of the bus recorder unit 12 via line 30 and to pilot control unit via line 32.

Bus interface 22 provides connection to the bus so that the data bus recorder 10 can receive and monitor message data in the form of binary words from the bus. The data bus recorder of the present illustration is operatively connected to two buses designated 36 and 38 in FIG. 1. Each bus is a MIL-STD-1553. While two buses are shown for purposes of illustration, the data bus recorder 10 of the present invention an be used with only one bus, or it can be adapted for use with more than two buses. Lines 40 and 42 connect bus interface 22 to the A and B connectors, respectively, of bus 36. Similarly, lines 44 and 46 connect interface 22 to the A and B connectors of bus 38. By way of example, in an illustrative data bus recorder 10, bus interface 22 comprises a commercially available industry pack carrier with two independent 1553 bus industry packs mounted as mezzanine boards. Each industry pack is a self-contained board which interfaces with one dual redundant 1553 bus for monitoring purposes. One industry pack services the bus 36 A and B connectors which are located on the front panel of the housing for the bus recorder unit 12. The other industry pack services the bus 38 A and B connectors. The industry pack carrier provides an interface between the industry pack and a VME bus leading to bus interface 22 which will be described in further detail presently. This allows the processor 26 to direct operation of the industry packs and to receive bus messages from them. By way of example, in an illustrative bus interface 22, the industry pack carrier is of the type commercially available from Greenspring Computers under the designation VIPC310 and the industry packs are of the type commercially available from Greenspring Computers under the designation IP-1553.

As previously described, the MIL-STD-1553 bus is of the serial, asynchronous type employing Manchester encoding. Other serial asynchronous type buses employing Manchester encoding and with which the data bus recorder 10 of the present invention an be used to include MIL-STD-1773 and McAir A 3818 buses.

The storage interface 24 is connected to bus interface 22 and to processor 26 by a VME bus 50. Storage interface 24 is a PCMCIA interface which stands for Personal Computer Memory Card International Association which identifies a standard for peripheral cards utilized for memory expansion and which standard covers electrical (interface) and mechanical aspects. Storage interface 24 provides communication with an external mass storage device designated 56 in FIG. 1. In particular, interface 24 accommodates insertion of a 1.8 inch PCMCIA hard disk or Flash (non-volatile) card into bus recorder unit 12. The interface 24 allows bus recorder unit 12 to read and write data from these mass storage devices 56. Storage interface 24 also contains an on-board Flash (non-volatile) memory that stores the operational software for bus recorder unit 12. During power up initialization the program is loaded into the memory of processor 26 where it ultimately executes. The storage interface 24 will be described in further detail presently.

Processor 26 controls all functions of the data bus recorder 10. It initializes bus interface 22 for filtering of the message traffic on the bus being monitored in accordance with the user defined criteria. That criteria, in turn, is provided by the configuration file defined on the disk 56 as will be described in further detail presently. Processor 26 is connected to bus interface 22 and to storage interface 24 by the VME bus 50. During operation of data bus recorder 10, processor 26 reads data from the bus interface 22 and stores it to the hard disk 56 of bus recorder unit 12 for post event or post mission analysis. Processor 26 also works in conjunction with bus interface 22 to generate a 32 bit time tag saved with each message that is recorded. In particular, bus interface 22 generates the 16 least significant bits of the time tag while processor 26 provides the 16 most significant bits. Processor 26 also executes board level diagnostics for fault isolation in a maintenance mode. By way of example, in an illustrative data bus recorder 10, processor 26 can be a central processing unit commercially available from Microlink Products Division of Sea-Ilan, Inc. under the designation 92200-901.

The pilot control unit 14 provides a means enabling the operator of the data bus recorder 10 to start and stop data recording. It is connected to the bus recorder unit 12 via a single multi-conductor cable 60. Pilot control unit 14 receives 12 volt DC power from the power supply 20 of bus recorder unit 12 and utilizes an onboard power converter module to produce the necessary voltages for its operation. All pilot control unit functions are controlled by an onboard processor which communicates with the bus recorder unit 12 via the RS-232 serial communications part 16.

The pilot control unit 14 has three indicators and two switches that provide status indication and control of the bus recorder unit 12 which will be described in detail presently. Briefly, a power indicator signals that the bus recorder unit 12 is turned on and a ready indicator signals that initialization is complete and the bus recorder unit 12 is ready to record. Data recording is initiated by the user depressing a record switch button on the pilot control unit 14. In turn, a record indicator signals confirmation that the bus recorder unit received the command. The ready and record indicators remain illuminated while recording is in progress. A subsequent depression of the record switch button bolts recording at which the ready and record indicators are turned off. The ready indicator is turned back on after the bus recorder unit 12 has completed closing files and is ready to begin another recording operation. The indicators also are used to inform the user of additional conditions that might develop during operation of the data bus recorder 12. For example, simultaneous blinking of the ready and record indicators signals that the disk 56 is full. A general disk failure, such as a write error on an incorrectly formatted disk, is signaled by the ready indicator being off and the record indicator blinking. Miscellaneous errors, such as hardware initialization errors are signaled by the ready indicator blinking while the record indicator is off.

The data bus recorder 10 of the present invention operates in the following manner. The data bus recorder 10 operates in conjunction with a computer designated 70 in FIG. 1 which also is called a recorder analysis station. Computer 70 preferably is an IBM compatible personal computer which allows the operator to define 1553 message traffic to be collected by the data bus recorder 10 and subsequently recovers the collected data from the disk 56. The data is expanded and saved to a database where the software of computer 70 allows the user to reduce/display the data using operator controlled filters and report definitions. Data bus recorder operation begins at the recorder analysis station 70 where the operator runs the station software. Using simple pull down menus and a point and click interface, the operator specifies a configuration file which defines the message to collect from each of the two 1553 buses supported by the data bus recorder 10. Collection may include all bus traffic or may by filtered by terminal number, subaddress, and transmit/receive flags to limit the collected data. The configuration is then saved to a PCMCIA removable hard disk or Flash card 56 installed in the computer 70.

The hard disk 56 is then transferred from the computer to the bus recorder unit 12, being placed into operative relation with storage interface 24. On power up, the bus recorder unit 12 retrieves the configuration file from the hard disk 56 and initializes its data collection filters. If no configuration file is found, the recorder collects all message traffic encountered on the one or more 1553 buses connected to the bus interface 22. The bus recorder unit 12 remains idle until it receives a record command initiated by the user depressing the record switch button on the pilot control unit 14. If the pilot control unit 14 is not connected, the bus recorder unit 12 automatically starts recording approximately 45 seconds after power up. The bus recorder unit 12 records all appropriate message traffic in accordance with the configuration file parameters. Collected data is time tagged and saved to the hard disk 56. Time tagging is accomplished using a counter timer that maintains a time since start of recording. Recording ceases when the hard disk 56 is full or when the record button on the pilot control unit is depressed again. Recording may be started and stopped repeatedly if desired. A new file is created each time recording is started and stopped under control of the pilot control unit 14. If the unit 14 is not connected, the bus recorder unit 14 will continue recording until the disk 56 is full or the unit is powered down.

When a mission or event is complete, the hard disk 56 is removed from the bus recorder unit 12 and transferred to the recorder analysis station 70 for processing. The operator retrieves the data from the hard disk 56 using the recorder analysis station software. The software expands the data and saves it to a database on the main hard drive of the computer 70. The recovery process can be rather lengthy for large data files (approximately one minute per megabyte of data on the PCMCIA hard disk 56). The expanded data may also occupy as much as ten times more disk space on the main drive of computer 70. Once expanded, the data can be filtered and displayed in a variety of ways using report generation features of the software of recorder analysis station 70. Reports may also be printed by computer 70.

The data bus recorder 10 contains embedded software which controls processor initialization and data collection. This software runs under the OS-9 operating system, a product of Microware Corporation. Structure charts and flow diagrams for this software along with a detailed description will be provided further on in the specification. A general description of the software is as follows. Upon power up, processor 26 begins execution of the OS-9 boot strap program. The OS-9 boot strap is responsible for the initialization of the hardware of processor 26 and all OS-9 data structures. After this initialization, the bus recorder unit application program is copied from the Flash memory of storage interface 24 into the RAM of processor 26 and the bus recorder unit application program is started. The bus recorder application program initializes all the bus recorder unit specific hardware, i.e the hardware of bus interface 22 and storage interface 24 and starts the process by which it determines the type of disk drive 56. By "disk drive" is meant either a rotating media drive or a solid state drive. The determination of disk drive type entails reading both the master boot block and the boot block of disk 56. From this information the bus recorder unit 12 determines the disk drive specifications and uses this data to initialize its data structures. After determining the disk type, the bus recorder unit application program configures the 1553 data monitoring. The bus recorder unit application tries to read the two configuration files that are stored on the disk 56. If they are present then the file's data is used to configure the selective monitoring of various 1553 bus addresses and subaddresses. If the files are not present then the bus recorder unit defaults to a "monitor all" configuration, i.e. monitoring all 1553 bus traffic. Lastly, the 1553 data file is allocated. The data file is stored on disk 56 and occupies all available disk space. The file is allocated prior to the start of 1553 data monitoring so that monitoring can start immediately after the operator presses the record switch on the pilot control unit 14. With system initialization completed the bus recorder unit 12 has two choices. If a pilot control unit is connected to the bus recorder unit 12 then the unit 12 waits for the user to depress the start button on unit 14 to begin monitoring. However, if a pilot control unit is not connected to the bus control unit 12, bus monitoring commences immediately.

Once recording has started, the bus re corder unit application program executes a small background loop that when a buffer is full writes it to disk, updates status indicators on the pilot control unit 14, and sends status messages out of the console port. This background loop continues until one of the following occurs: the disk becomes full; monitoring is stopped by the user; disk error precludes continuing monitoring. In particular, when the disk 56 becomes full, 1553 bus messages can no longer be written to it, so the program closes the 1553 data file and causes the ready and record indicators on pilot control unit to blink so as to inform the user that recording has stopped due to disk being full. When the user stops the monitor function the application program closes the 1553 data file, allocates another file (with a different name) and returns to the section that waits for the user to start recording. The number of 1553 disk files is limited only by the size of the disk's root directory. If the disk drive 56 fails in such a manner that further recording is impossible the bus recorder unit application program attempts to close the data file and then enters a halt loop where causes one of the indicators on pilot control unit 14 to blink so as to inform the user that a catastrophic disk error has occurred. Recorded data is saved on disk 56 along with certain header information to allow the bus activity to be reconstructed at a later time on the recorder analysis station 70. The format for this data will be shown and described presently. Storage of the 1553 bus activity in this format, which can be accessed as a database of message traffic, makes the data bus recorder 10 of this invention unique among all other bus recorders. It provides the operator a data file which can be immediately analyzed without requiring extensive, time consuming postprocessing to convert a video tape recording into numerical data for use by a commercial computer.

Thus, the data bus recorder 10 of the present invention is usable with industry standard mass storage media, such as disk 56, and it records bus message traffic selectively in accordance with criteria preset by the user. In other words it does not blindly record all electronic activity on the target bus in a video format for replay at a later time, but instead the data bus recorder 10 interprets the bus message traffic in real time to determine if it meets the specified criteria and then records only those messages of interest. This selective recording is particularly advantageous for analysis of specific events occurring on the bus. In addition, data collected from the bus is advantageously saved in an MS-DOS compatible file format so that disk 56 can be easily transferred to any standard personal computer for data recovery and analysis. MS-DOS is a registered trademark of Microsoft Corporation.

Figure 2:
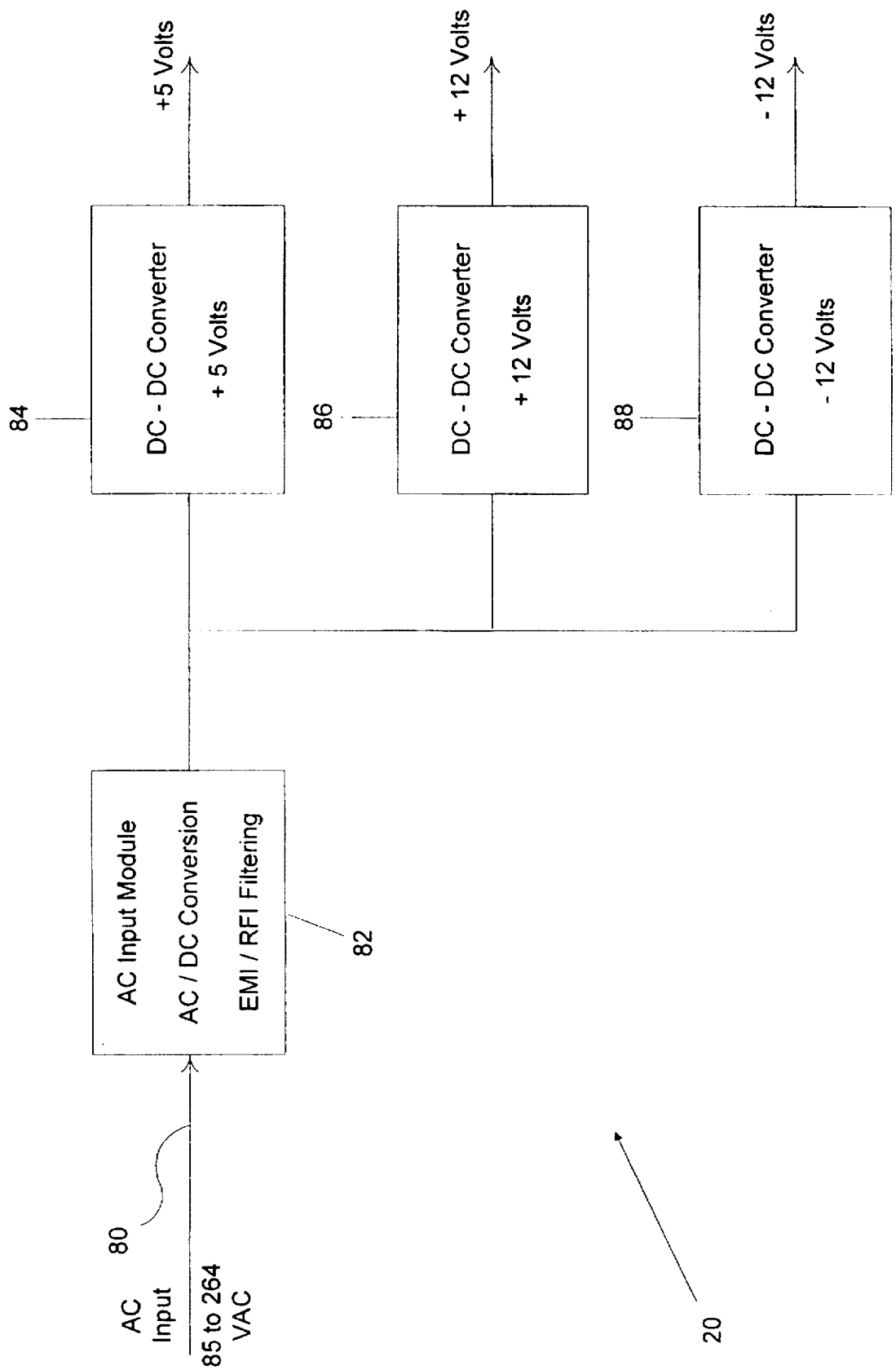
FIG. 2 is a schematic block diagram of the power supply in the data bus recorder of FIG. 1.

The power supply 20 of the bus recorder unit 12 is shown in further detail in FIG. 2. Incoming AC power on line 80 is rectified by module 82 which also provides filtering of electromagnetic and radio frequency interference. The output of converter 82 is applied to each of the inputs of DC—DC converters 84, 86 and 88 which provide +5 volts DC., +12 volts DC and −12 volts DC, respectively, for use by various components of bus recorder unit 12 and pilot control unit 14.

Figure 3:
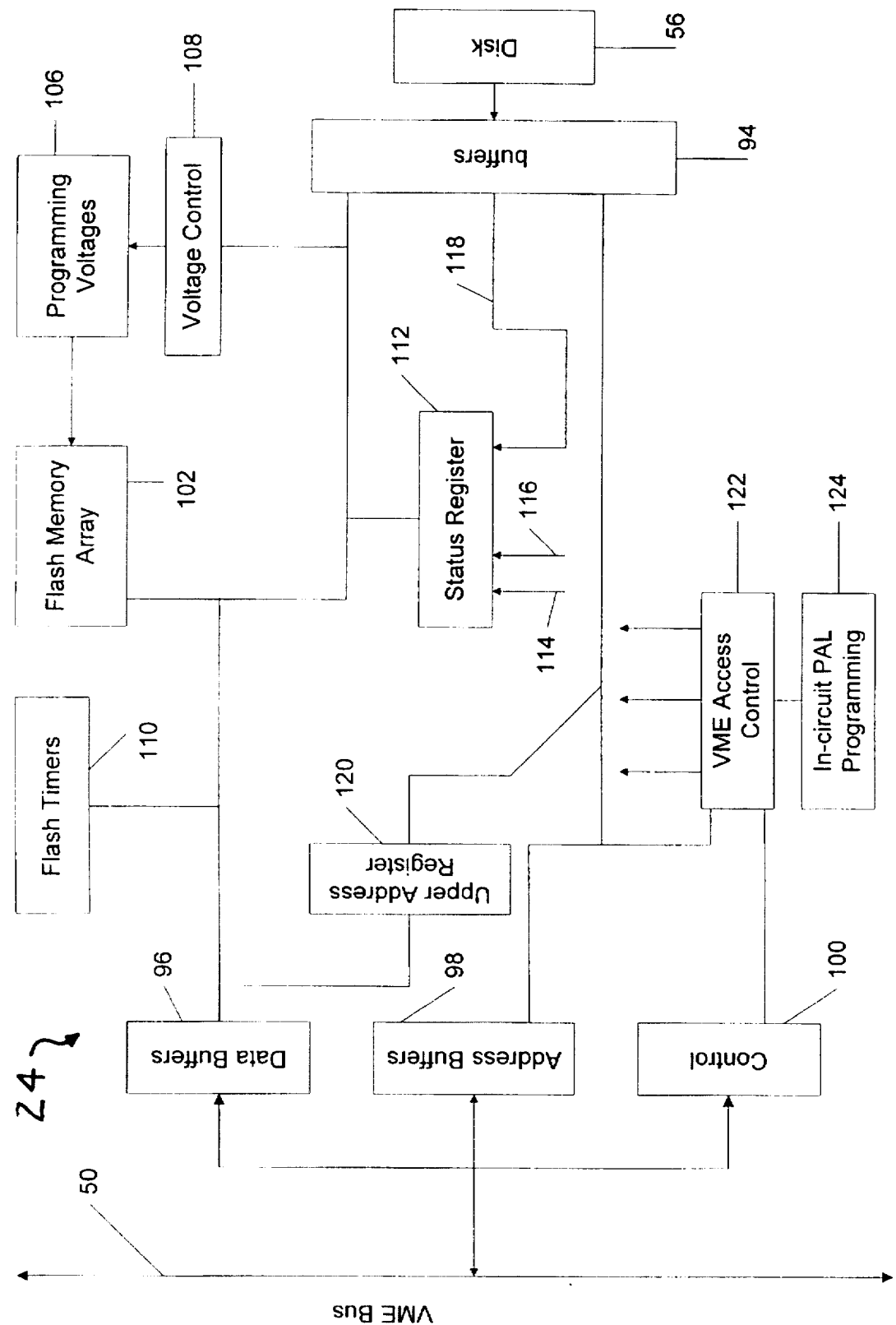
FIG. 3 is a schematic block diagram of the storage interface in the data bus recorder of FIG. 1.

The storage interface 24 of the bus recorder unit 12 is shown in further detail in FIG. 3. The flow of information to and from disk 56 is directed by buffers 94 which allow for unidirectional movement of address information, i.e. to the disk 56, and which allow for bi-directional movement of data, i.e., to and from disk 56. Buffers 96, 98 and 100 direct the movement of data, address and control information, respectively, between VME bus 50 and interface 24. Storage interface 24 includes a Flash (non-volatile) memory 102 which stores the application program utilized by processor 26 as previously described. Programming voltages for Flash memory 102 are provided by component 106 and the associated voltage control 108. Storage interface 24 also includes timers 110 which provide timing signals for use by the system. Status register 112 receives various status indications such as that from a temperature sensor on line 114, the status of timers 110 on line 116 and an indication on line 118 that disk 56 is inserted in drive 92 as well as a write protection indicator. An upper address register 120 connected to data buffer 96 and disk drive register 94 expands the 24 bit VME address to a 26 bit address compatible with the PCMCIA format of disk 56. A VME access control 122 connected to address and control registers 98 and 100, respectively, in conjunction with in-circuit PAL programming 124 decodes the VME address, provides various data strobes and produces VME OTACK and IACK operations.

Figure 4:
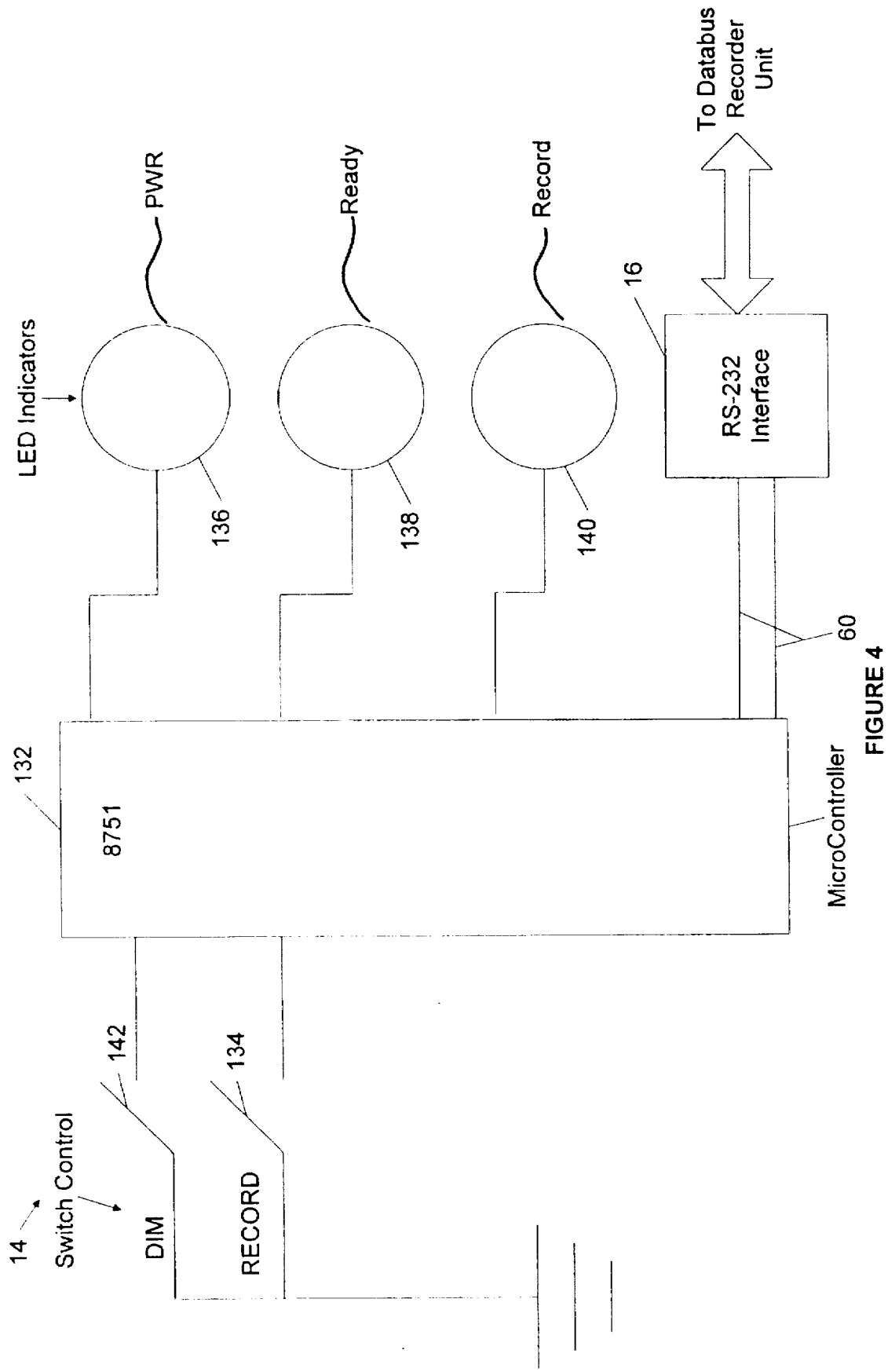
FIG. 4 is a schematic block diagram of the pilot control unit of the data bus recorder of FIG. 1.

The pilot control unit 14 is shown in further detail in FIG. 4. It is centered around an 8751 microcontroller 132. The RS-232 connector/interface 16 provides communication between processor 26 of the bus recorder unit 12 and microcontroller 132 of the pilot control unit 14. Switch 134 connected to microcontroller 132 is the main control switch which enables the aircraft pilot or other operator of the data bus recorder 10 to control manually the times at which bus recording is started and stopped. Microcontroller 132 controls the operation of three LED indicators 136, 138 and 140 which are the power, ready and record indicators previously described. By way of example, in an illustrative data bus recorder 10, the light-emitting diodes comprising indicators 136, 138 and 140 can be green, amber and red in color. The intensity of the indicators can be controlled in a step-wise manner by means of the switch 142 connected to microcontroller 132.

Figure 5:
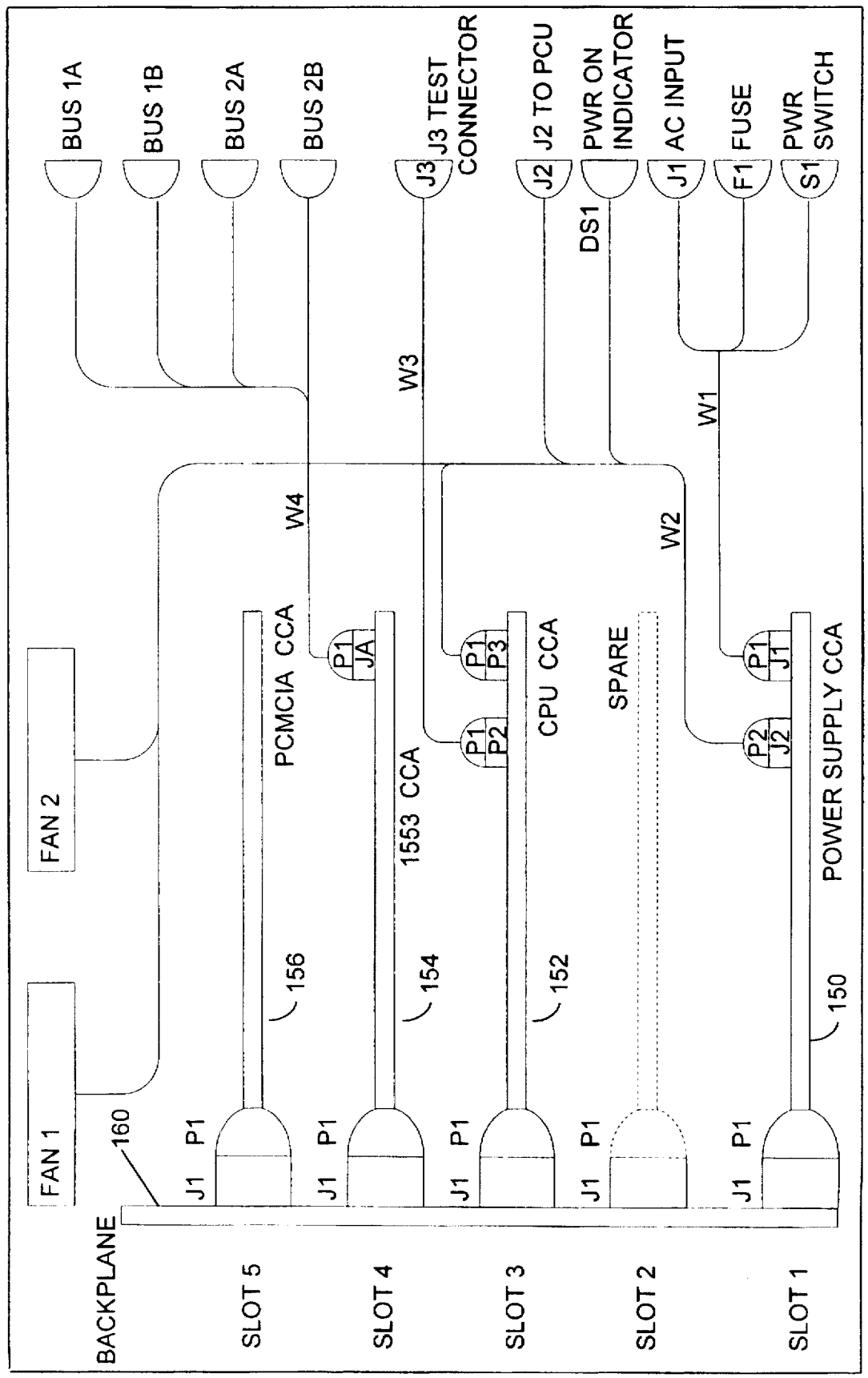
FIG. 5 is a schematic diagram illustrating arrangement of circuit card assemblies for the data bus recorder of the present invention.

FIG. 5 is a wiring diagram which illustrates the physical arrangement of circuit card assemblies of the bus recorder unit 12. The bus recorder unit 12 comprises a ruggedized chassis which contains four 3U format VME bus circuit cards. The arrangement shown in FIG. 5 contains five slots with the fifth slot being reserved for expansion. The four circuit card assemblies 150, 152, 154 and 156 are for the power supply 20, processor 26, bus interface 22 and storage interface 24. The four circuit card assemblies are joined to a single blackplane 160 which, by way of illustration, can be of the type commercially available from Bicc-Vero Electronics under model no. 243-59411. As a result of the physical arrangement and organization of components, bus recorder unit 12 can have an overall height of about 6.5 inches, overall width of about 4.75 inches and overall length of about 11.5 inches. Pilot control unit 14 can have an overall height of about 6.0 inches, an overall width of about 3.4 inches and an overall length of about 1.5 inch. Bus recorder unit 12 and pilot control unit 14 can have weights as low as 10 pounds and 1.5 pounds, respectively. Accordingly, the small size and low weight of the data bus recorder 10 of the present invention advantageously enables it to be readily and easily installed and accommodated in the cockpit of a compact aircraft, such as a fighter aircraft, wherein space constraints are extremely high.

Figure 6:
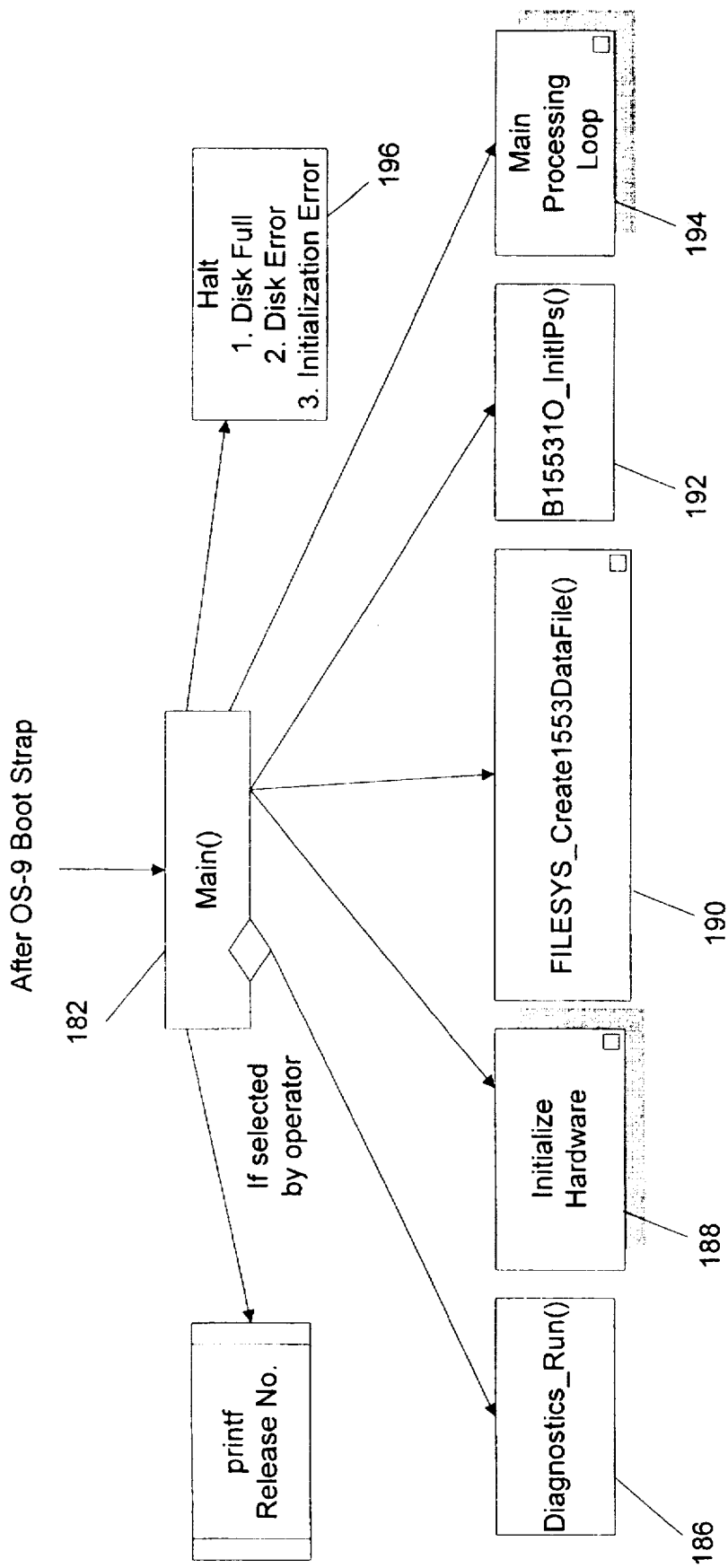
FIG. 6–22 are structure charts illustrating software for controlling the processor of the data bus recorder of FIG. 1.

FIGS. 6–22 are structure charts and flow diagrams illustrating the embedded software contained in data bus recorder 10 which controls initialization of processor 26 and data collection. The software runs under the OS-9 operating system, a product of Microware Corporation. Referring to FIG. 6, the main module 182 is the top level application program for bus recorder unit 12. It initializes the bus recorded unit 12. It includes a loop wherein it waits for pilot control unit 14 to start and then collects data until unit 14 stops or disk 56 becomes full. The data collecting operation includes: loading 1553 data into a software buffer writing a full data buffer to disk 56, marking the buffer as empty, updating pilot control unit 14 and printing statistics. The module 182 also creates the halt commands 196 when disk 56 is full, when a general disk error occurs or when an initialization error occurs. The DIAGNOST routine 186 performs top level control of the diagnostics of bus recorder unit 12 including presenting a menu to the operator and executing an appropriate routine according to the operator's selection. The initialize hardware routine 188 and main processing loop 194 are described in conjunction with FIGS. 7 and 8. The FILESYS routine 190 creates a 1553 bus data file that encompasses all the free space on disk 56. The B1553IO routine 192 initializes the 1553 industry packs and associated data structure in bus interface 22 by setting up an information block for each pack and then initializing each pack.

Figure 7:
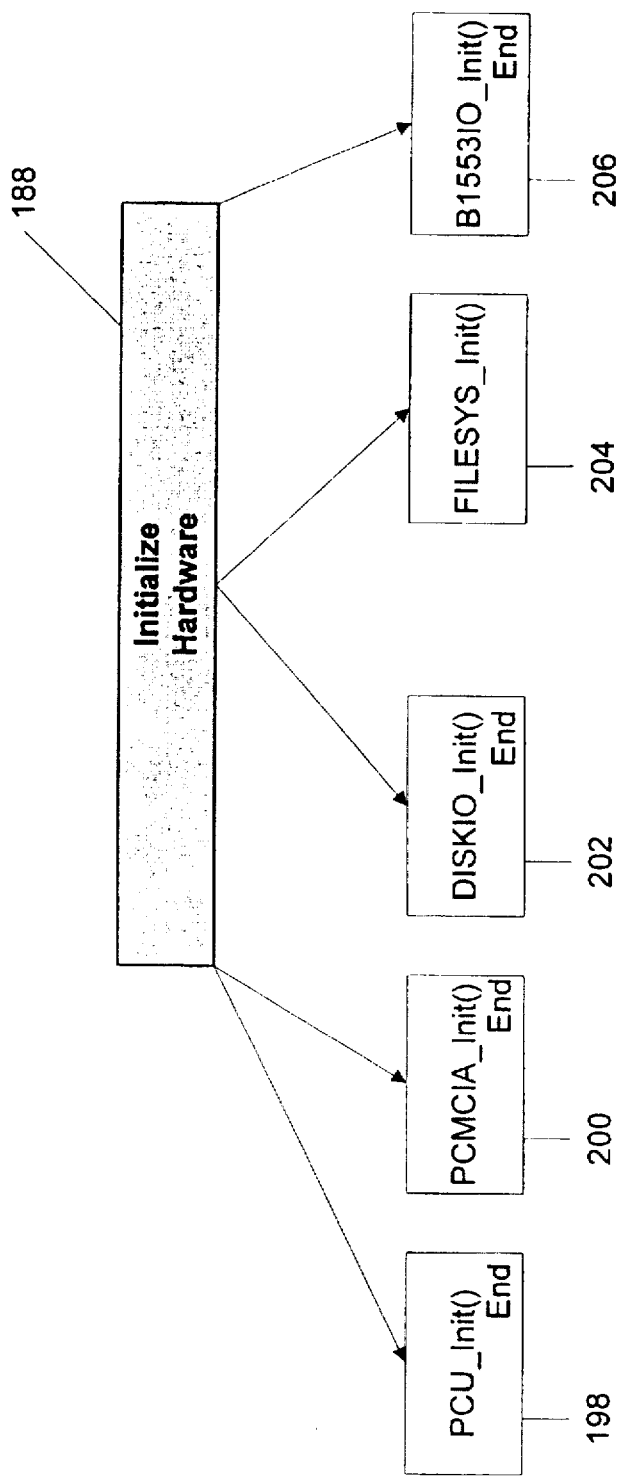

The initialize hardware routine 188 is shown in further detail in FIG. 7. PCU Init 198 initializes pilot control unit 14, and PCMCIA Init 200 initializes storage interface 24. The DISKIO Init routine 202 makes sure that disk 56 is installed in the storage interface 24 and sets the circuit card assembly of interface 24 and disk 56 to use primary I/O mapping. The FILESYS Init routine 204 initializes the file system by reading the master boot record and boot record to determine the configuration of disk 56, reads disk format information, i.e. FAT, into the memory of processor 26 and reads the Root directory into memory. The B1553IO Init routine 206 sets up the data buffers and associated structures.

Figure 8:
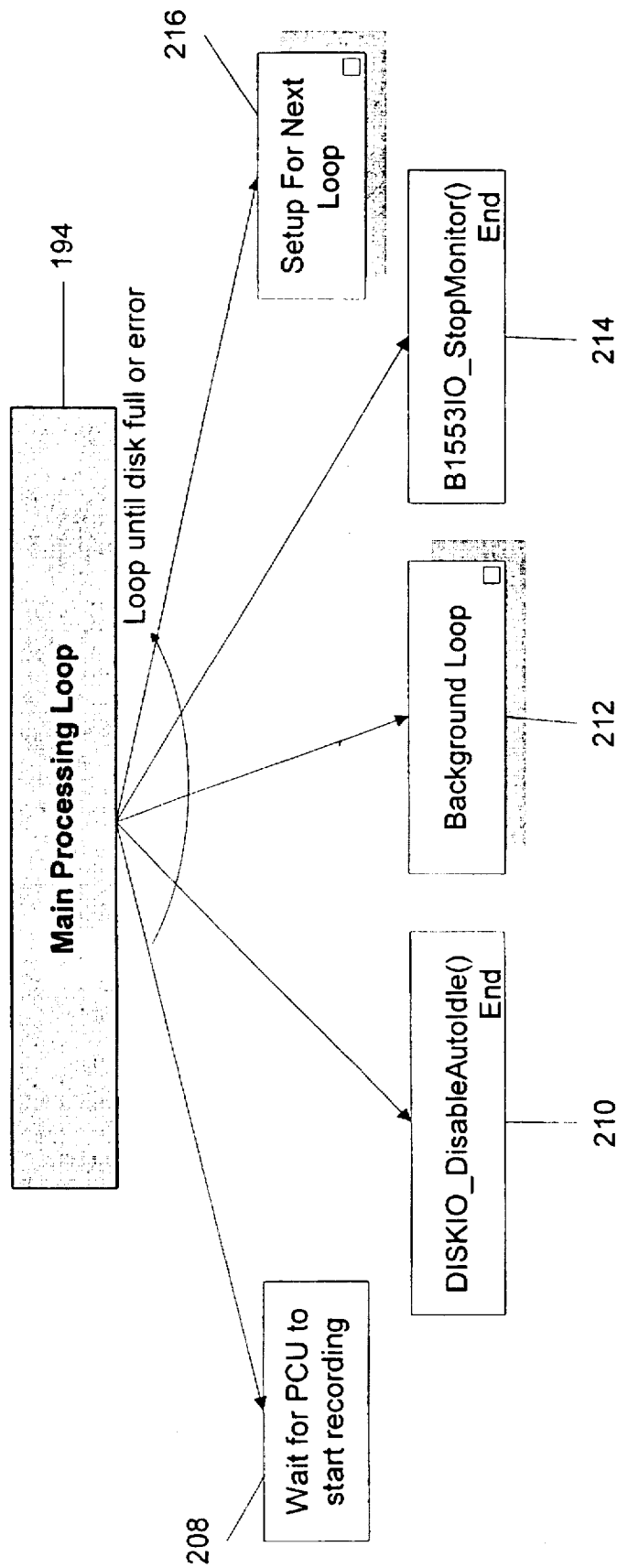

The main processing loop 194 is shown in further detail in FIG. 8. As previously described it loops until disk 56 is full or an error occurs, and the loop begins at routine 208 by waiting for pilot control unit 14 to command the start of recording. The DISK10 Disable Auto Idle routine 210 disables the auto idle feature of disk 56 so that disk 56 in effect remains spinning thereby decreasing the disk response time by eliminating the time normally required to spin up the disk. The background loop 212 and setup for next loop 216 are described in connection with FIGS. 9 and 10, respectively. The B1553IO Stop Monitor routine 214 stops the 1553 monitor function performed by the software and disables the interrupts.

Figure 9:
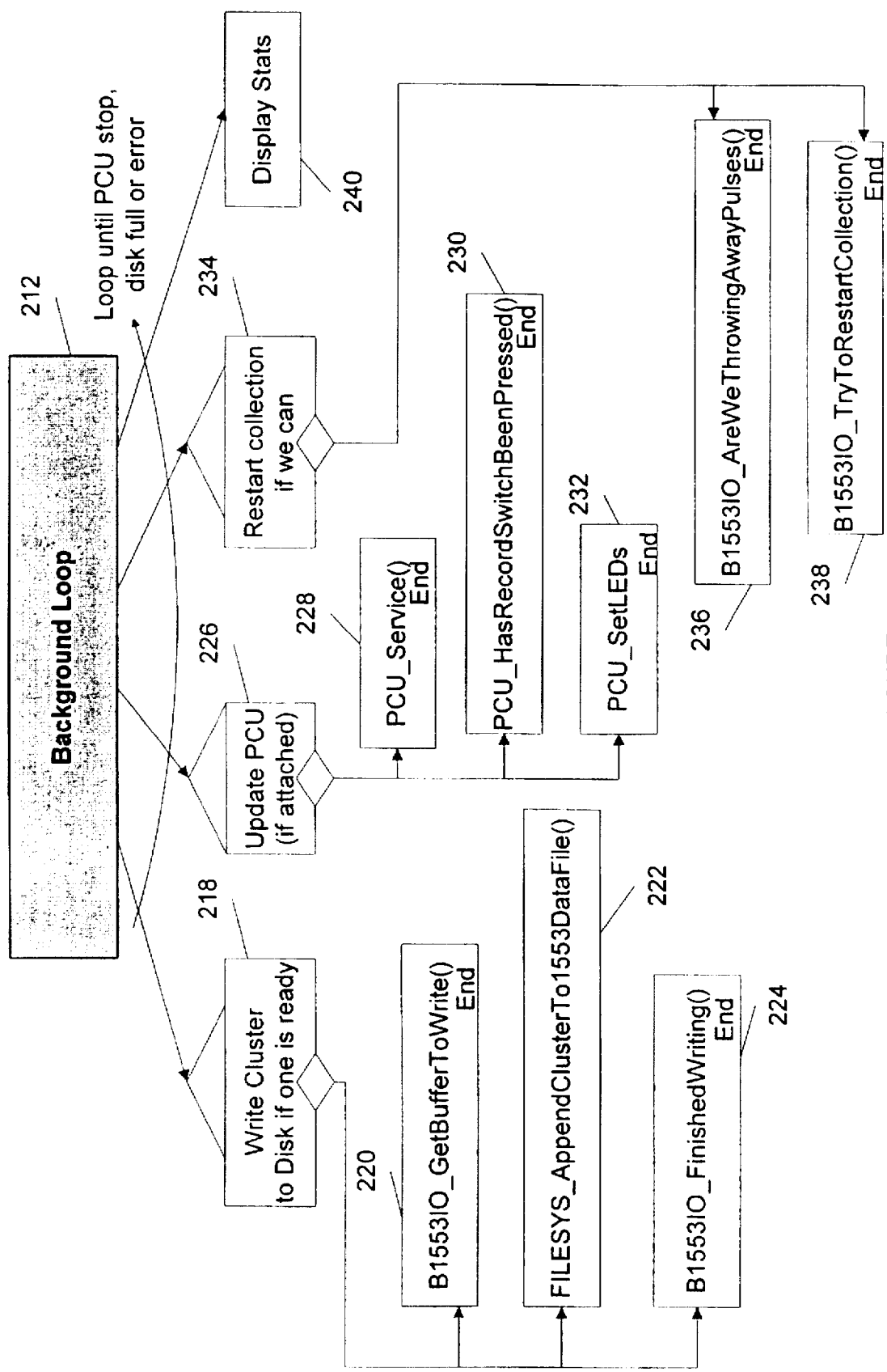

The background loop 212 is shown in further detail in FIG. 9. As previously described, the loop continues until pilot control unit 14 issues a stop command or until disk 56 is full or an error occurs. The first operation 218 is to write a cluster to the disk 56 if ready. The Get Buffer to Write Routine 220 in that operation returns a pointer to the next buffer to write and marks the buffer as being written. The FILESYS Append Cluster routine 222 appends a cluster buffer to the 1553 data file. The Finished Writing routine 224 is called after the background loop 212 finishes writing to disk 56 and marks the buffer as free. The second operation 226 in background loop 212 is to update pilot control unit 14 if it is connected to bus recorder unit 12. The PCU Service routine 228 services the pilot control unit task by determining if any data has been received from the unit 14 and processing it accordingly. The Has Record Switch Been Pressed routine 230 returns a TRUE signal if the record switch 134 of pilot control unit 14 has been closed since the last calling up of this routine. The Set LEDS routine 232 sends the current state of the LED indicators 136, 138 and 140 to microcontroller 132 of pilot control unit 14. The third operation 234 in loop 212 is to restart bus data collection if that can be done. The Are We Throwing Away Pulses routine 236 returns the value of the Throw Away Flag which is TRUE if all the 1553 buffers are full and messages must be discarded and which is FALSE if messages are not being thrown away. With respect to the Try To Restart Collection routine 238, if the throwaway flag is TRUE, then this routine sees if all the buffers are free, and if yes then restarts bus data collection. If not, i.e. the throwaway flag is FALSE, then this routine does nothing. The final operation 240 in background loop 212 is to display statistics.

Figure 10:
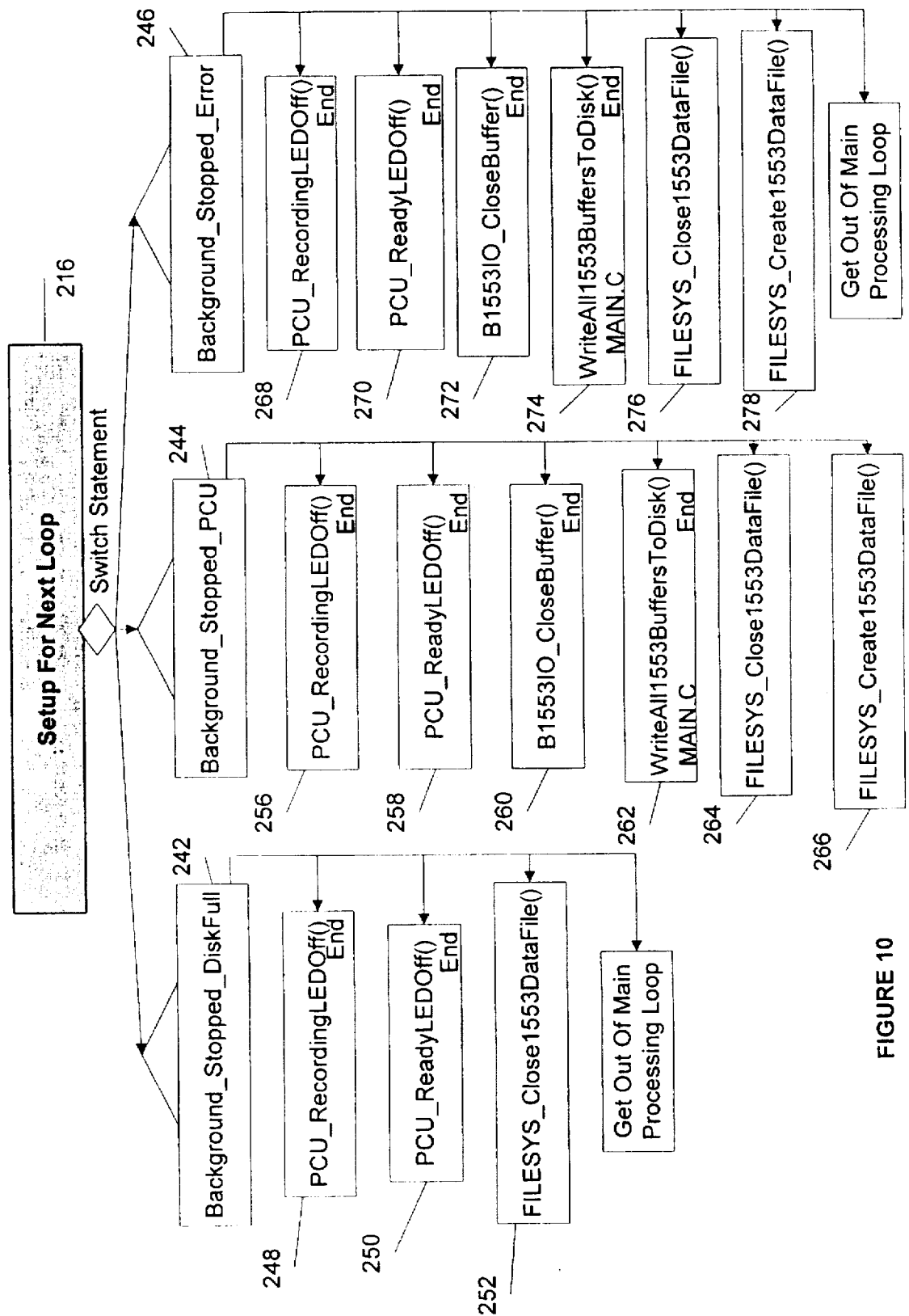

The setup for next loop routine 216 is shown in further detail in FIG. 10. As previously described this includes the three halt commands to stop when disk full 242, pilot control unit requests stop 244 and error occurs 246. Considering first the disk full command 242, the routines 248 and 250 turn off the recording LED 140 and ready LED 138, respectively, of pilot control unit 14. The Close 1553 Data File routine 252 performs an orderly closing of the 1553 data file by determining how many clusters the file actually used, returning all unused clusters to the free state, updating the directory with file size information and writing new directory and disk formal information (FAT) to the disk. Then the program exits the main processing loop 194.

Considering next the pilot control unit stop command 244, the routines 256 and 258 are identical to routines 248 and 250 previously described. The Close Buffer routine 260 adds an End of File indicator to the active 1553 buffer and marks it as full. The next routine 262 writes all the 1553 buffers to disk 56. Routine 264 is identical to the routine 252 previously described. The create 1553 Data File routine 266 creates a 1553 bus data file that encompasses all the free space in disk 56.

Turning now to the error occurrence command 246, the routines 268, 270, 272, 274, 276 and 278 are identical to the routines 256, 258, 260, 262, 264 and 266, respectively, described above in connection with pilot control unit stop command 244. At the conclusion of routine 278 the program exits the main processing loop 194.

Figure 11:
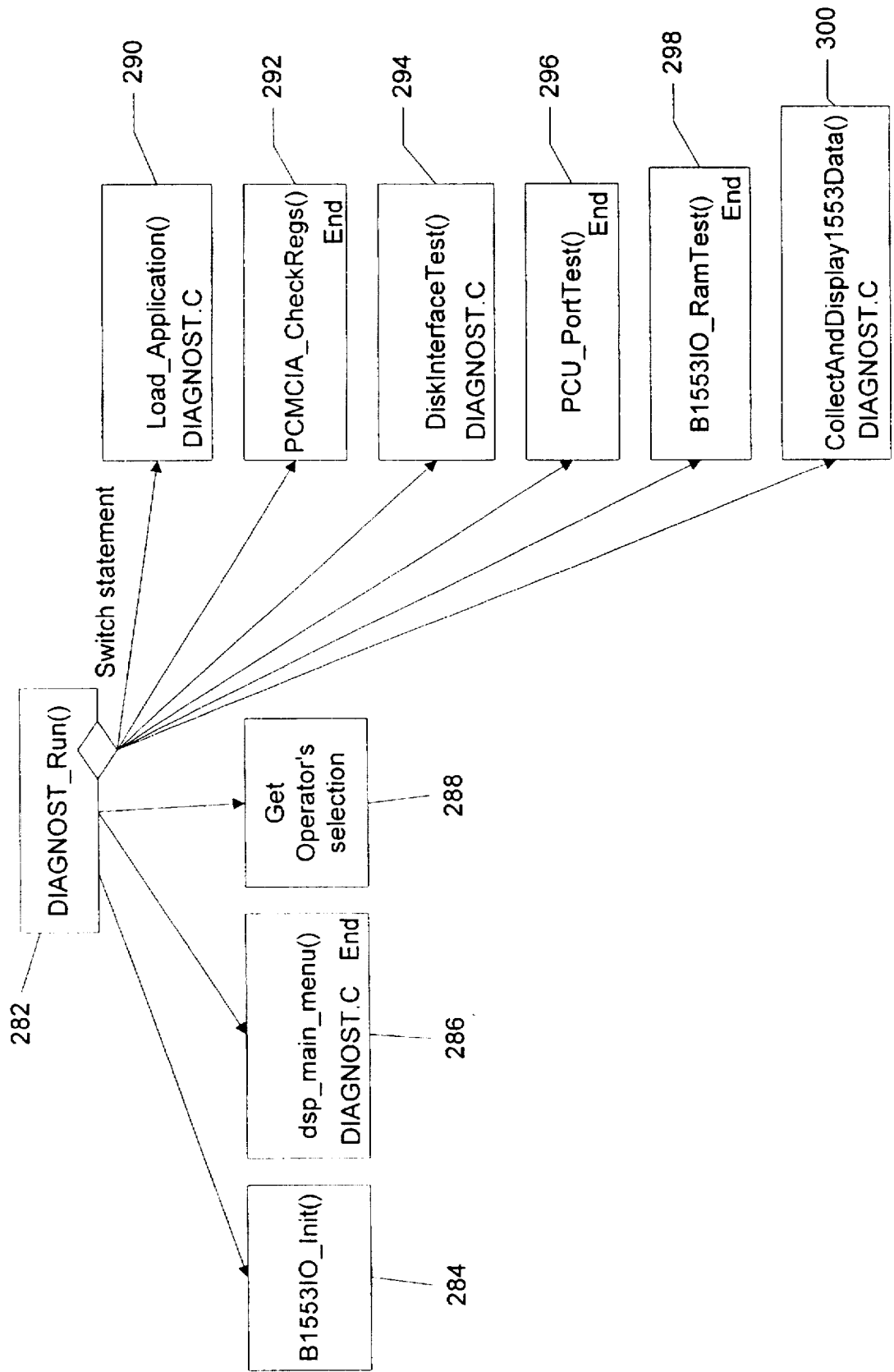

The DIAGNOST Run routine 282 shown in FIG. 11 performs the top level control of diagnostics for bus recorder unit 12. It presents a menu to the operator and executes the appropriate routine per the operator's selection. First the 1553 IO Init routine 284 sets up the data buffers and associated structures, then the main diagnostics menu is displayed as indicated at 286 whereupon the operator's selection is obtained at 288. The load application routine 290 loads the application program from disk 56 to flash memory 102 of storage interface 24. In the check regs routine 292, the registers and timers of storage interface 24 are checked. Into each register all possible values are written and then the values are read back. The timer test makes sure that each timer can be cleared and that each timer reaches its terminal count. The disk interface test routine 294 tests the disk interface of storage interface 24 and reads/writes some sectors on disk 56. The PCU port test routine 296 tests the port of pilot control unit 14. The 1553 Ram Test routine 298 tests the RAM on the 1553 Industry Packs of bus interface 22. The collect and display data routine 300 collects a single 1553 buffer and displays the data.

Figure 12:
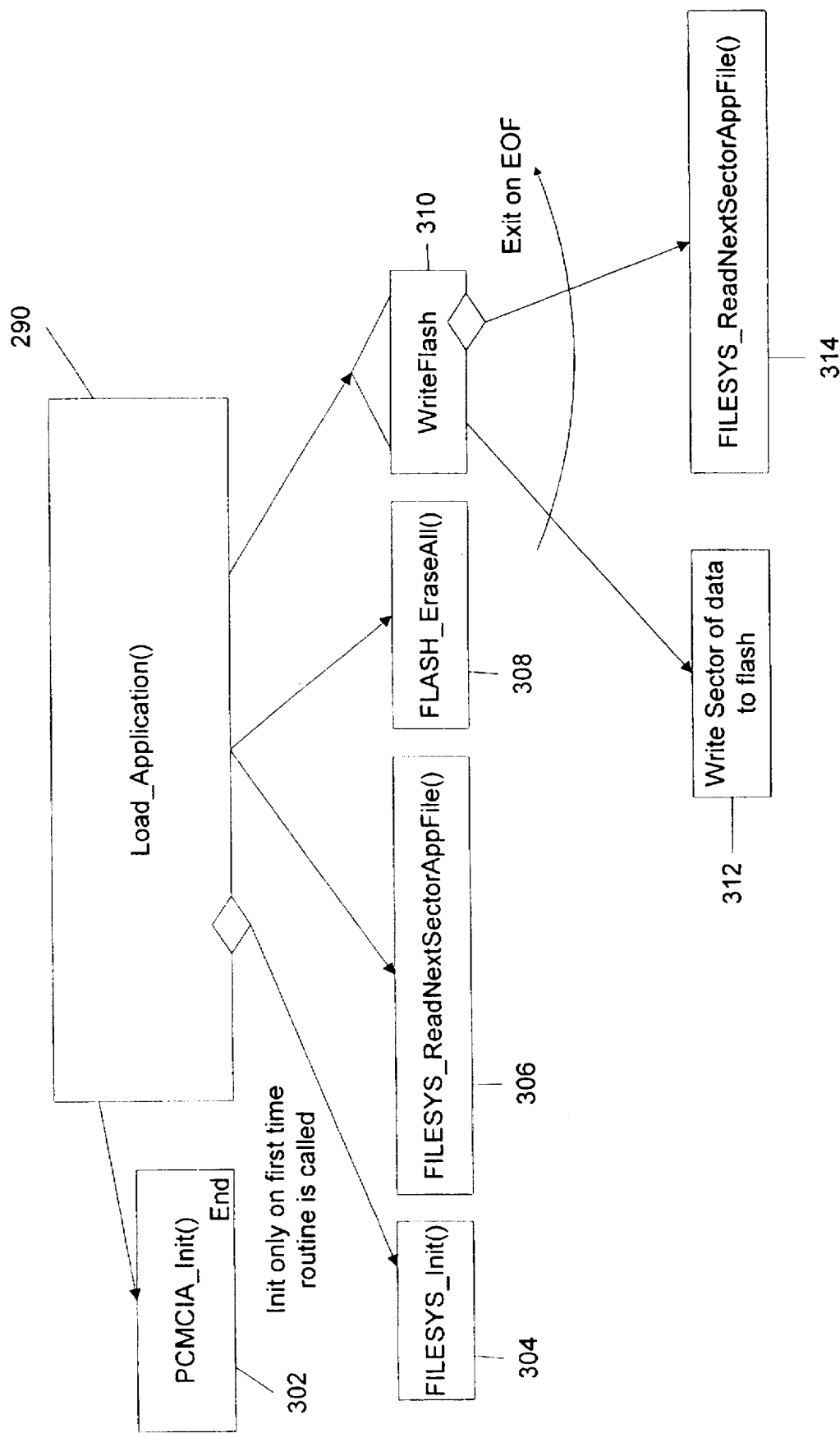

The load application routine 290 is shown in further detail in FIG. 12. As previously described, it loads the application program from disk 56 to flash memory 102 of storage interface 24. The application file is copied verbatim into the flash memory 102, starting with the first location in memory 102. The Init routine 302 initializes storage interface 24 by setting the on-board registers to zero. The FILESYS Init routine 304 initializes the file system by reading the master boot record and boot record to determine the nature of disk 56, reading FAT (disk format information) into memory, and reading Root directory into memory. The read next sector app file routine 306 reads the next sector from the application file into a sector buffer. The Flash erase all routine 308 erases all the flash memory 102 of bus interface 24. The Write Flash routine 310 writes information into flash memory 102 and includes the routine 312 of writing a sector of data into the flash memory followed by the routine 314 which is identical to routine 306 previously described. After the write flash routine 310 the program exits an end of file.

Figure 13:

The FLASH Erase All routine 308 is shown in further detail in FIG. 13. As previously described it erases all of the flash memory 102 of storage interface 24. A first main portion 310 of the routine erases two adjacent on-board flash memory chips including the first ½ Meg, and a second main portion 312 of the routine erases another two adjacent on-board flash memory chips including the second ½ Meg. Both routine portions follow the algorithm from the INTEL manual for the 28 FO20 Quick-Erase algorithm. After each of the routine portions 310 and 312 the program carries out the following routines. Routine 314 turns on the programming voltage 106 to flash memory 102, routine 316 writes all locations in two adjacent chips to zero, routine 318 erases the chips and routine 320 turns off the programming voltage 106 to flash memory 102.

Figure 14:
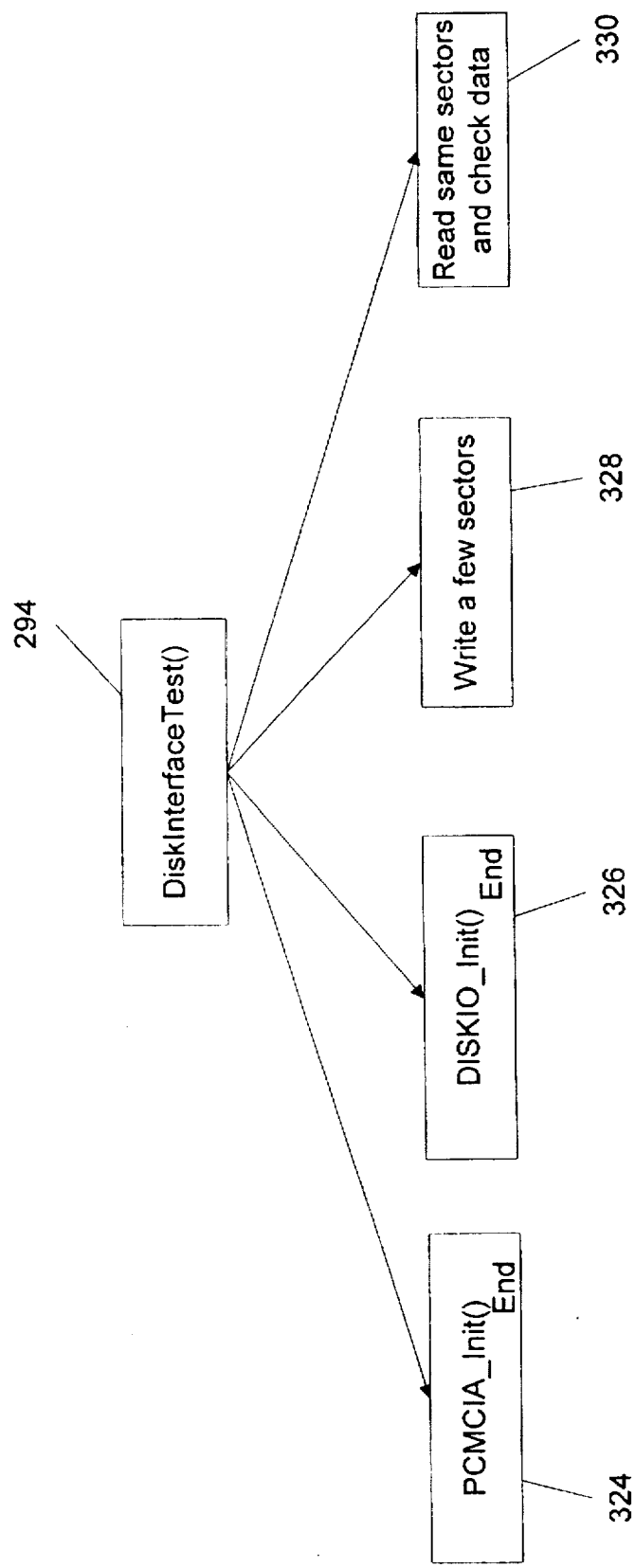

The disk interface test routine 294 shown in further detail in FIG. 14 tests the disk interface of storage interface 24 by reading and writing some sectors on disk 56. Routine 324 sets all on board registers of storage interface 24 to zero. Then the DISK IO Init routine 326 makes sure that disk 56 is installed and sets the circuit card assembly of storage interface 24 and disk 56 to use primary I/O mapping. Then a few sectors of disk 56 are written as indicated at 328 in FIG. 14 followed by reading those same sectors and checking data as shown at 330.

Figure 15:
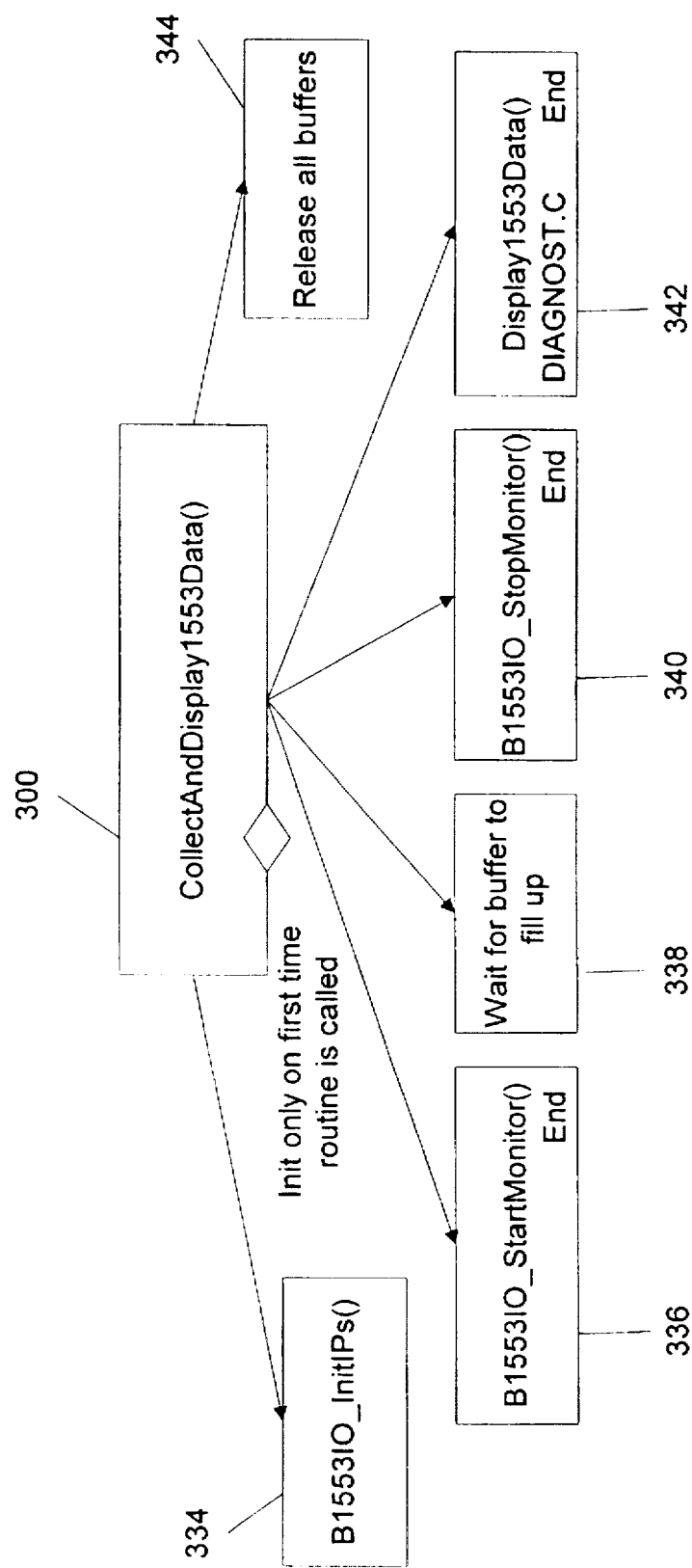

FIG. 15 illustrates in further detail the collect and display data routine 300. The Init IPs routine 334 is called only on the first time that collect and display data routine 300 is executed. Routine 334 initializes the 1553 industry packs and associated data structures of bus interface 22. It provides a set up information block for each industry pack and initializes each pack. Next, the start monitor routine 336 starts the bus monitor function. In particular, it clears all 1553 buffers to free and set other variables that are used to keep track of the buffers. The routine also clears time tags and forces time tag rollover messages into both industry packs of bus interface 22 into the 1553 buffer. It also resets the command and data stack pointers on both industry packs of bus interface 22. Finally, the routine enables interrupts if a compile flag is defined and then starts the monitoring of data from the bus.

Next, the program waits for the buffer to fill up as indicated at 338 whereupon the monitoring function is stopped and interrupts are disabled as indicated at 340 in FIG. 15. The display data routine 342 displays the first ten messages from the 1553 data buffer. Then all buffers are released as indicated at 344.

Figure 16:
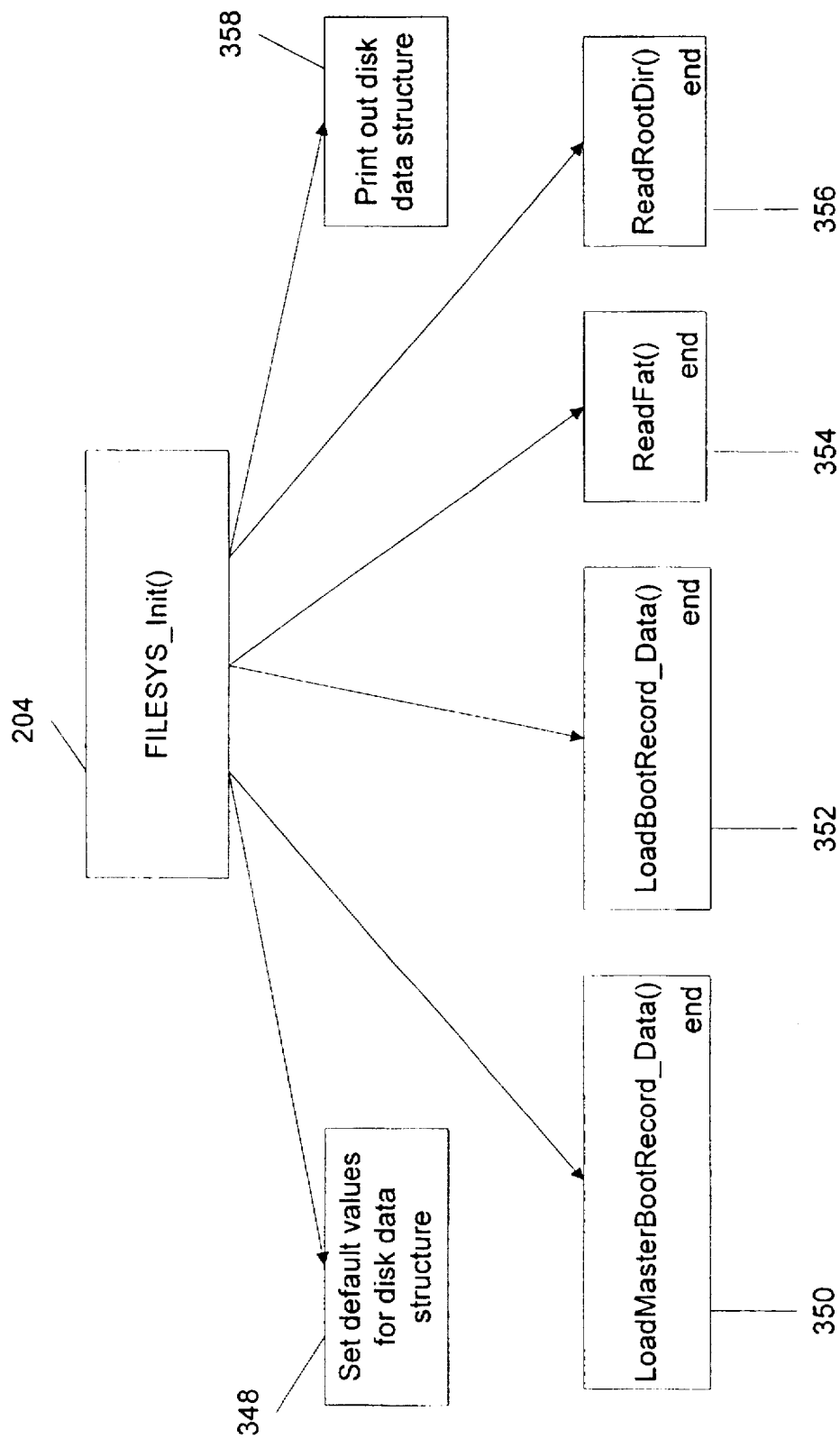

The FILESYS Init routine 204 is shown in further detail in FIG. 16, and it provides the routines necessary to access the files on disk 56. In this connection, although the format of disk 56 is DOS compatible, the routine is based on a single 1553 data file with a memory resident FAT. Furthermore, the routine assumes that disk 56 has been formatted and that the first sector contains a boot record. The FILESYS Init routine 204, as previously described, initializes the file system by reading the master boot record and boot record to determine disk 56 configuration, reads FAT into processor 26 memory and reads the root directory into that memory. As shown in FIG. 16, the program sets default values for data structures of disk 56 as indicated at 348 in FIG. 16 whereupon routine 350 reads a master boot sector of disk 56 and loads the required data structures with data obtained from the master boot sector. Next, routine 352 reads a boot sector of disk 56 and loads the required data structures with data obtained from the boot sector. The Read FAT routine 354 reads the first FAT, i.e., disk format information, into the memory of processor 26 by allocating enough memory for the FAT and then reading the FAT from disk 56. The Read Root Dir routine 356 reads the root directory of disk 56 into a root directory structure. It does this by allocating enough memory in processor 26 for the directory array and then reading the root directory from disk 56. Then the program prints out the disk data structure as indicated at 358 in FIG. 16.

Figure 17:
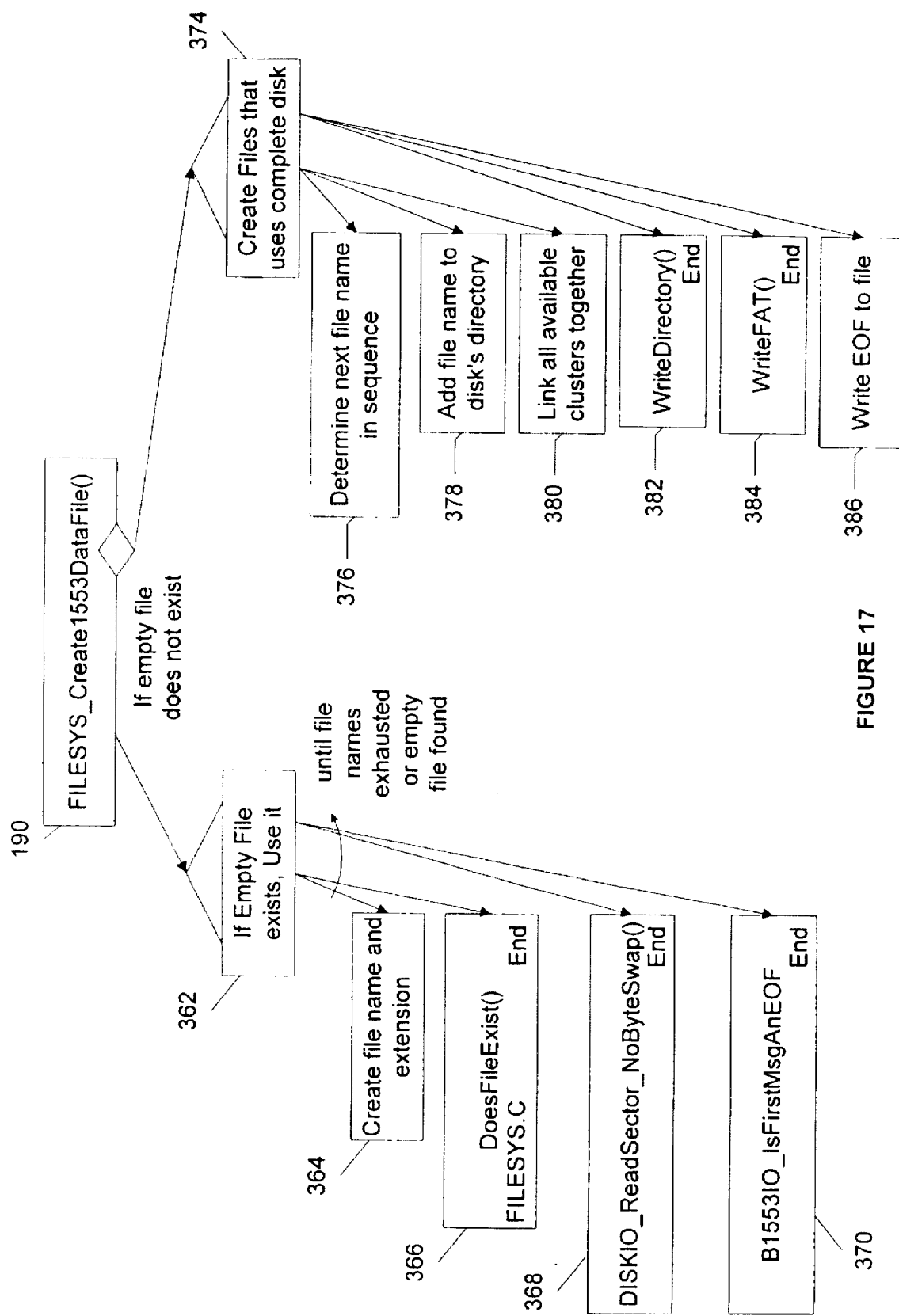

The FILESYS Create 1553 Data File 190 is shown in further detail in FIG. 17. As previously described, it creates a 1553 data file that encompasses all the free space on disk 56, and writes an End of File message, i.e. a 1553 type message, in the first cluster. This can be used to later recover files that do not contain any data. As shown in FIG. 17, the program uses an empty file if it exists and creates the file name and extension as indicated at 362 and 364, respectively. The routine 366 determines if the filename exists in the root directory and, if so, returns its size, starting cluster and pointer to the directory entry. The routine 368 reads a sector from disk 56 into a buffer. The calling program must specify cylinder number, head number, sector number and a pointer to the data buffer. Routine 368 assumes a sector count of one and a drive number of zero. Routine 370 determines if the first message on a buffer is equal to the End of File message.

If an empty file does not exist, as noted in FIG. 17, the program creates files that use the complete disk as indicated at 374. Then the program determines the next file name in sequence, adds the file name to the directory of disk 56 and links all available clusters together as indicated at 376, 378 and 380, respectively, in FIG. 17. The Write Directory routine 382 writes the root directory to disk 56, the Write FAT routine 384 writes the FAT to disk 56, and then the program writes EOF to the file as indicated at 386.

Figure 18:
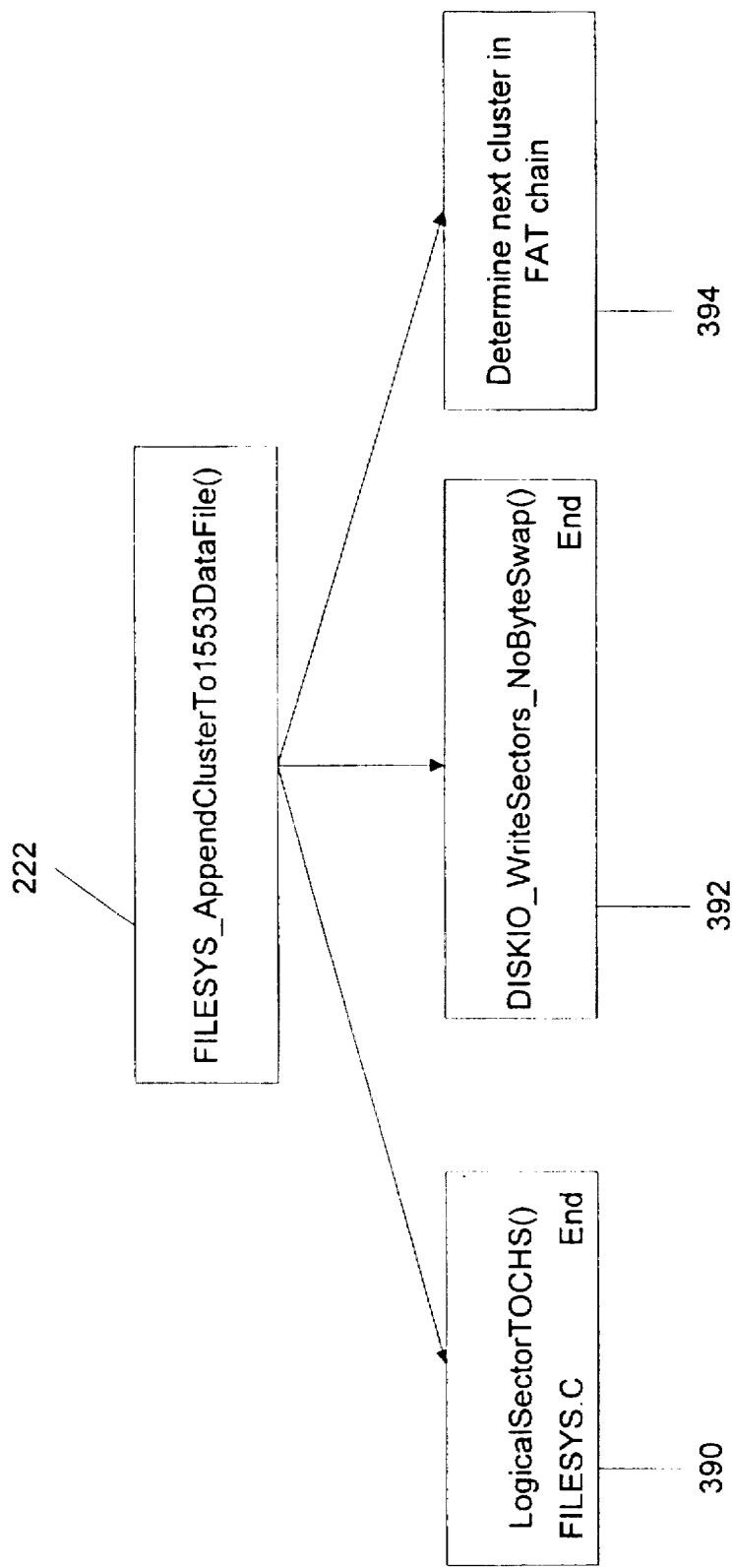

The FILESYS Append Cluster to 1553 Data File routine 222 is shown in further detail in FIG. 18. The Logical Sector TOCHS routine 390 converts a logical sector to cylinder, head and sector. Routine 392 writes a specified number of sectors, i.e. 1–256, to disk 56 from a buffer. The calling program must specify the starting cylinder number, head number, sector number and a pointer to the data buffer, as well as the number of sectors to write. The routine assumes a drive number of zero. As indicated at 394 the program then determines the next cluster in the FAT chain.

Figure 19:
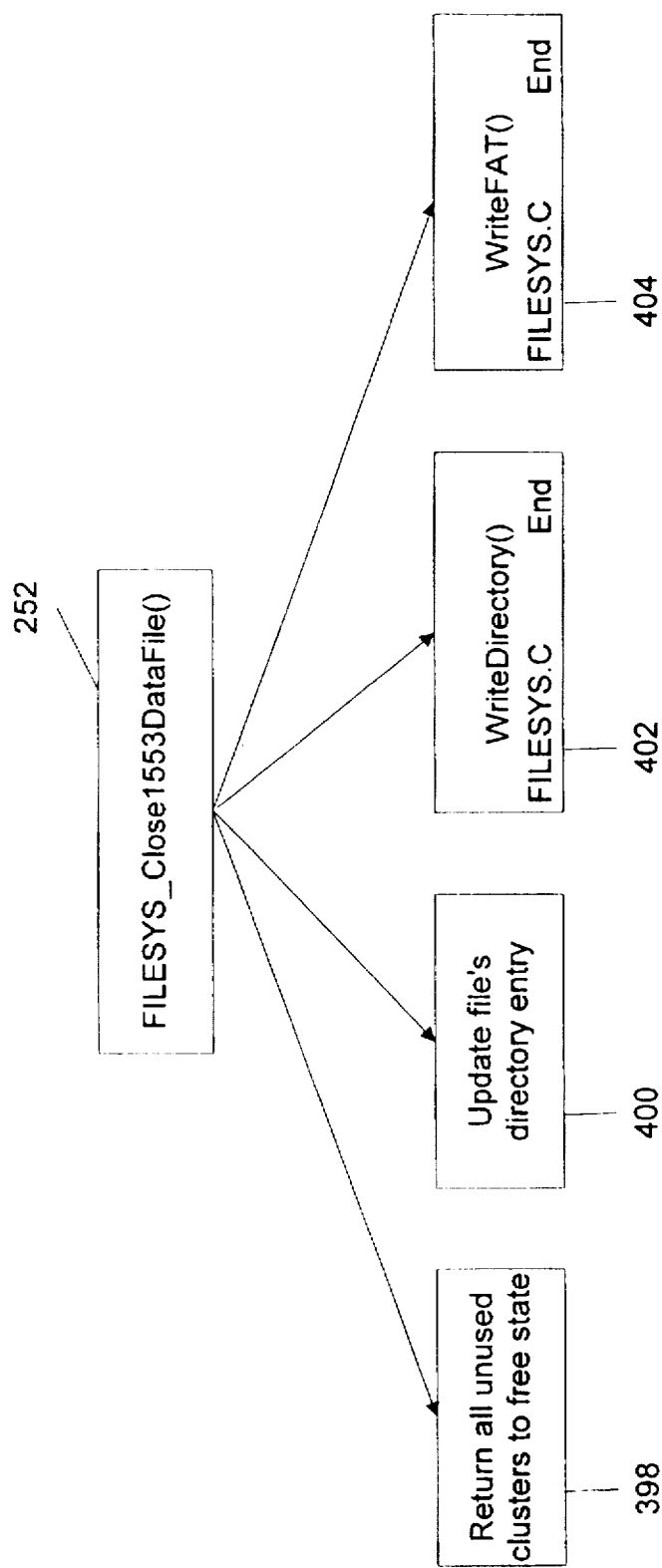

The FILESYS Close 1553 Data File routine 252 is shown in further detail in FIG. 19. As previously described, it performs an orderly closing of the 1553 data file. In particular, the routine determines how many clusters the file actually used, returns all unused clusters to the free state as indicated at 398 in FIG. 19, updates the directory with size information as indicated at 400 in FIG. 19, and writes new directory and FAT(S) to disk 56 as indicated at 402 and 404, respectively, in FIG. 19.

Figure 20:
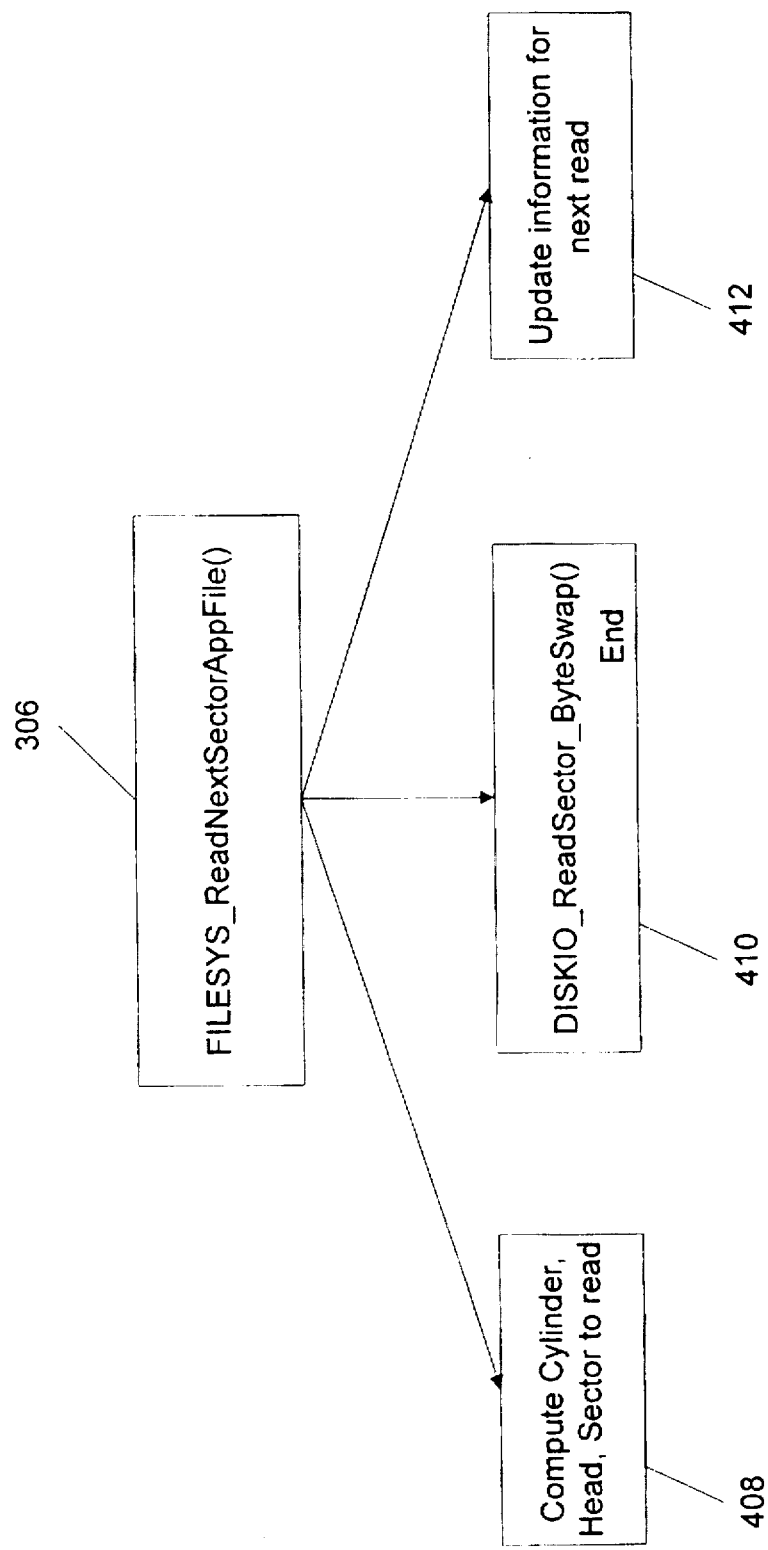

The FILESYS Read Next Sector App File routine 306 is shown in further detail in FIG. 20, and it reads the next sector from the application file into a sector buffer. As shown at 408 in FIG. 20, the program computes the cylinder, head and sector to read. Routine 410 reads a sector from disk 56 into a buffer. The calling program must specify cylinder number, head number, sector number and a pointer to the data buffer. The routine assumes a sector count of one and a drive number of zero. The program then updates information for the next read as indicated at 412.

Figure 21:
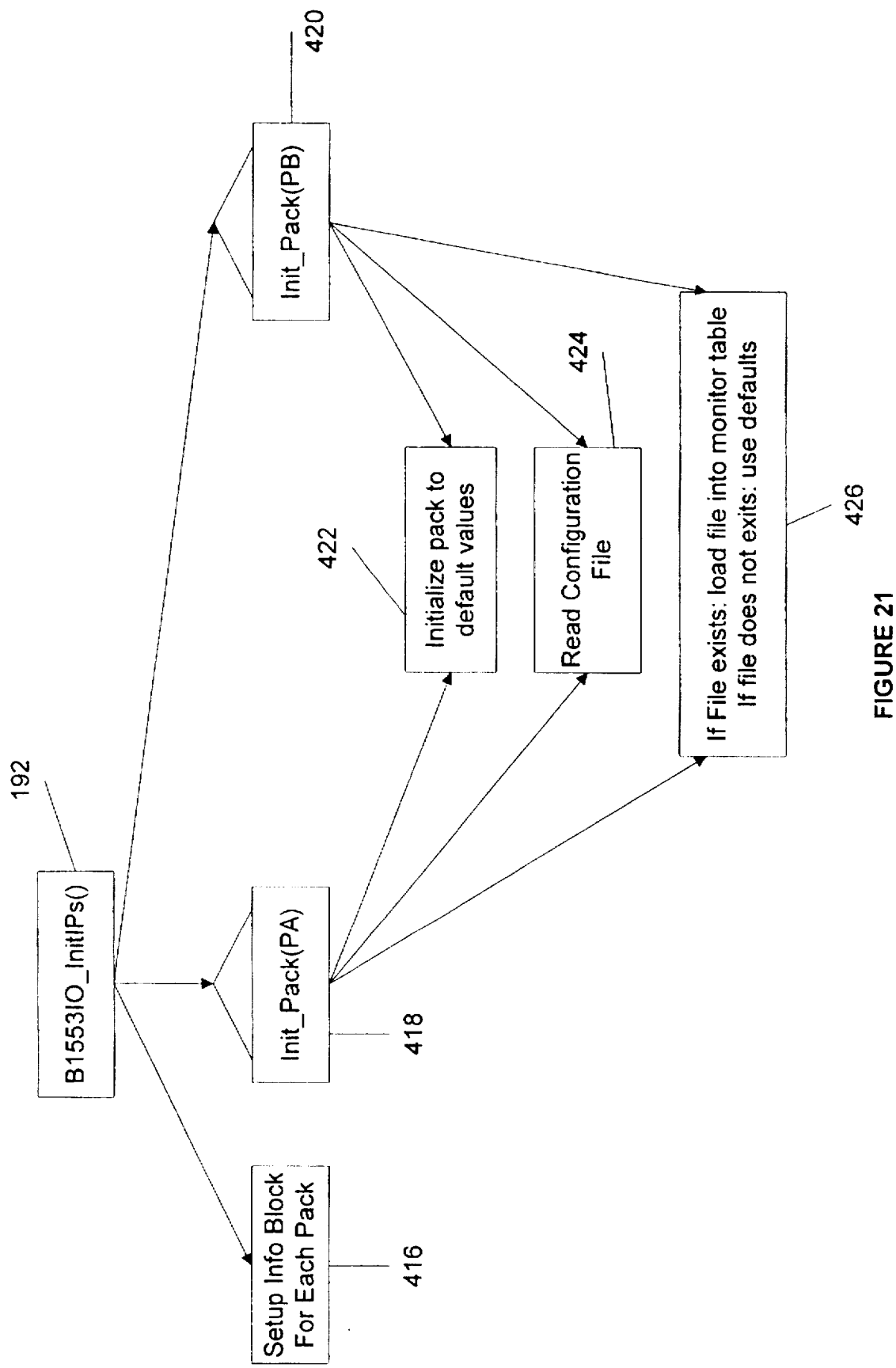

The B1553IO Init IPs routine 192 is shown in further detail in FIG. 21. As previously described, this routine initializes the 1553 Industry Packs and associated data structure in the bus interface 22. It sets up an information block for each pack as indicated at 416, initializes pack A of the industry pack carrier as indicated at 418 and then initializes pack B of the industry pack carrier as indicated at 420 in FIG. 21. Pack A is cabled to bus 1, also designated bus 36 in FIG. 1, and pack B is cabled to bus 2, also designated bus 38 in FIG. 1. As shown in FIG. 21, the program then initializes each pack to default values as indicated at 422, reads the configuration file as indicated at 424 and if a file exists loads the file into a monitor table as indicated at 426. If a file does not exist, the program uses defaults.

Figure 22:
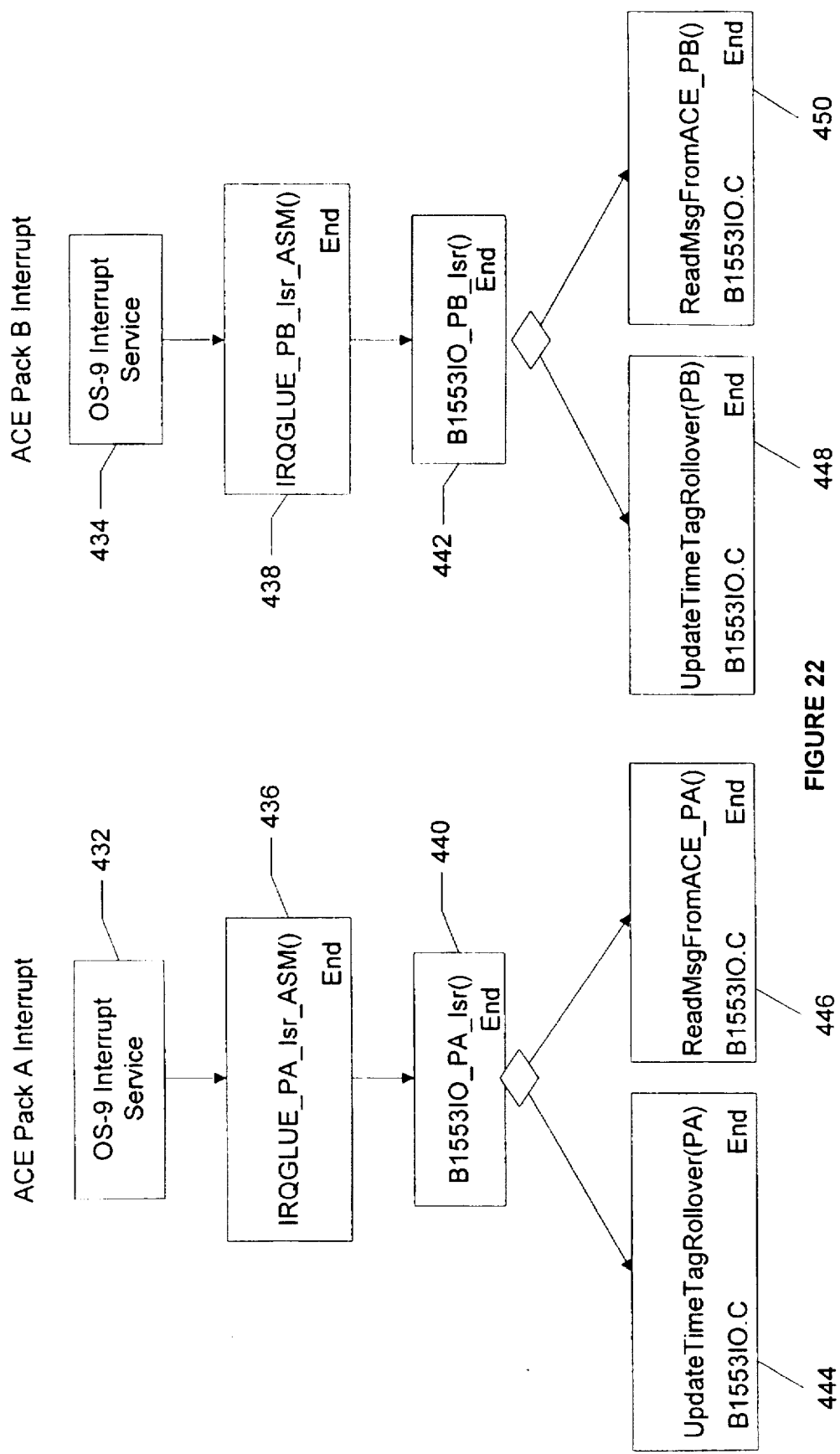

FIG. 22 illustrates the interrupt services for Packs A and B of the industry pack carriers in bus interface 22. Both are initiated by the OS-9 operating system as indicated at 432 and 434. Routine 426 is the assembly language routine that the OS-9 operating system calls when the 1553 pack A interrupts. It performs some initial setup and then calls the real interrupt service routine. Similarly, routine 438 is the assembly language routine that the OS-9 operating system calls when the 1553 pack B interrupts. It likewise performs some initial setups and then calls the real interrupt service routine. Routine 440 is the C language interrupt service for pack A. It determines which interrupt and then calls the appropriate general service routine. Similarly, routine 442 is the C language interrupt service for pack B. It likewise determines which interrupt and then calls the appropriate general service routine.

As shown in FIG. 22, after routine 440, the Update Time Tag Rollover (PA) routine 444 increments the appropriate time tag rollover and loads the packet into the buffer. Then the Read Msg From ACE PA routine 446 gets a message from the ACE chip (1553 chip) of Pack A and loads the message into the current data buffer. After routine 442 the Update time tag Rollover (PB) routine 448 increments the appropriate time tag rollover and loads the packet into the buffer. Then the Read Msg From ACE PB routine 450 gets a message from the ACE chip (1553 chip) of Pack B and loads the message into the current data buffer.

FIG. 23 shows the format for recorded data saved on disk 56 with certain header information to allow the bus message activity to be reconstructed at a later time on the PC 70 of the recorder analysis station. FIGS. 24 and 25 illustrate the 1553 bus message formats.

It is therefore apparent that the present invention accomplishes its intended objects. While an embodiment of the present invention has been described in detail, that is for the purpose of illustration, not limitation.

What is claimed is:

1. A data bus recorder for monitoring a bus which transmits digital information between components of a system wherein the bus is a serial, asynchronous data bus employing Manchester encoding and wherein the information is in the form of binary data words reflecting command and response messages specific to the bus protocol, said data bus recorder comprising:

(a) bus interface means for connection to the bus to receive and process message data from the bus;

(b) a transferable mass storage device for storing user-defined criteria determining the bus message data to be monitored and for storing recorded bus message data, said transferable mass storage device being usable with a computer separate from said data bus recorder;

(c) storage interface means for providing communication with said mass storage device and for storing an operational program for said data bus recorder; and (d) processor means operatively connected to said bus interface means and to said storage interface means for receiving said user defined criteria and said operational program from said storage interface means and for directing operation of said bus interface means and receiving bus message data from said bus interface means according to said user defined criteria for recording said bus message data from said bus interface means on said mass storage device;

(e) so that said data bus recorder interprets the bus message data in real time according to said user defined criteria and records only that message data satisfying said criteria, the recorded bus data being in a personal computer compatible format.

2. A data bus recorder according to claim 1, wherein the bus protocol is MIL-STD-1553.

3. A data bus recorder according to claim 1, further including control means operatively connected to said processor means for enabling manual control of the beginning and ending of bus monitoring.

4. A data bus recorder according to claim 3, wherein said control means includes indicator means for visually signaling the operational status of said data bus recorder.

5. A data bus recorder according to claim 1, further including a personal computer for receiving said mass storage device for providing a configuration file on said device containing said user-defined criteria and for processing bus message data recorded on said device.

6. A data bus recorder according to claim 1, wherein said mass storage device comprises a disk.

7. A method for monitoring a bus which transmits digital information between components of a system wherein the bus is a serial, asynchronous data bus employing Manchester encoding and wherein the information is in the form of binary data words reflecting command and response messages specific to the bus protocol, said method comprising the steps of:

(a) providing a bus recorder unit comprising a bus interface, a storage interface and a processor operatively connected to each interface;

(b) connecting the bus interface to the bus to receive and process message data therefrom;

(c) providing a transferable mass storage device containing a configuration file including user-defined criteria determining the bus message data to be monitored, the transferable mass storage device being usable with a computer separate from the bus recorder unit;

(d) placing the mass storage device in operative association with the storage interface;

(e) retrieving the configuration file and conditioning the bus interface according to the user-defined criteria under control of the processor means; and (f) recording message data from the bus onto the storage device in accordance with the user-defined criteria in the configuration file and under control of the processor means;

(g) so that the bus message data is interpreted in real time according to the user defined criteria and only the message data satisfying that criteria is recorded onto the storage device.

8. A method according the claim 7, wherein the bus message data is recorded on the storage device in a personal computer format.

9. A method according to claim 8, further including transferring the mass storage device to a personal computer and processing the recorded message data using the personal computer.

10. A method according to claim 7, wherein said step of providing the transferable mass storage device comprises:

a) placing the storage device in operative association with a personal computer;

b) providing the configuration file on the storage device using the personal computer; and c) transferring the storage device from the personal computer to the storage interface of the bus recorder unit.

11. A method according to claim 7, wherein the bus protocol is MIL-STD-1553.

12. A method according to claim 7, wherein the mass storage device comprises a disk.

13. A data bus recorder for location in a compact aircraft such as a fighter aircraft for monitoring at least one bus which transmits digital information between components of the aircraft such as avionics, maintenance and electronic warfare information wherein the bus is a serial, asynchronous data bus employing Manchester encoding and wherein the information is in the form of binary data words reflecting command and response messages specific to the bus protocol, said data bus recorder comprising:

(a) bus interface means for connection to the bus to receive and process message data from the bus;

(b) a transferable mass storage device for storing user-defined criteria determining the bus message data to be monitored and for storing recorded bus message data, said transferrable mass storage device being usable with a computer separate from said data bus recorder;

(c) storage interface means for providing communication with said mass storage device and for storing an operational program for said data bus recorder;

(d) processor means operatively connected to said bus interface means and to said storage interface means for receiving said user defined criteria and said operational program from said storage interface means and for directing operation of said bus interface means and receiving bus message data from said bus interface means according to said user defined criteria for recording said bus message data from said bus interface means on said mass storage device;

(e) so that said data bus recorder interprets the bus message data in real time according to said user defined criteria and records only that message data satisfying said criteria, the recorded bus data being in a personal computer compatible format; and (f) control means selectively connected to said processor means for enabling manual control by the pilot of the aircraft of the beginning and ending of bus monitoring.

14. A data bus recorder according to claim 13, wherein the bus protocol is MIL-STD-1553.

15. A data bus recorder to claim 13, wherein said control means includes indicator means for visually signaling the operational status of said data bus recorder.

16. A data bus recorder according to claim 13, further including a personal computer externally located remote from the aircraft for receiving said mass storage device for providing a configuration file on said device containing said user-defined criteria and for processing bus message data recorded on said device.

17. A data bus recorder according to claim 13, wherein said mass storage device comprises a disk.

\* \* \* \* \*